United States Patent
Hanawa et al.

(10) Patent No.: US 10,707,514 B2
(45) Date of Patent: Jul. 7, 2020

(54) REDOX FLOW BATTERY

(71) Applicant: SHOWA DENKO K.K., Tokyo (JP)

(72) Inventors: Kenzo Hanawa, Chiba (JP); Masatoshi Ichikawa, Chiba (JP); Gaku Oriji, Chiba (JP); Irwansyah, Chiba (JP); Keizo Iseki, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 118 days.

(21) Appl. No.: 15/883,325

(22) Filed: Jan. 30, 2018

(65) Prior Publication Data

US 2018/0212266 A1 Jul. 26, 2018

Related U.S. Application Data

(63) Continuation-in-part of application No. PCT/JP2016/073128, filed on Aug. 5, 2016.

(51) Int. Cl.

| | |
|---|---|
| *H01M 8/00* | (2016.01) |
| *H01M 8/18* | (2006.01) |
| *H01M 2/40* | (2006.01) |
| *H01M 4/94* | (2006.01) |
| *H01M 8/0234* | (2016.01) |
| *H01M 8/04186* | (2016.01) |
| *H01M 4/86* | (2006.01) |

(52) U.S. Cl.
CPC ............ *H01M 8/188* (2013.01); *H01M 2/40* (2013.01); *H01M 4/94* (2013.01); *H01M 8/0234* (2013.01); *H01M 8/04186* (2013.01); *H01M 2004/8684* (2013.01); *H01M 2004/8689* (2013.01); *Y02E 60/528* (2013.01)

(58) Field of Classification Search
None
See application file for complete search history.

(56) References Cited

U.S. PATENT DOCUMENTS 9,614,251 B2 * 4/2017 Farmer .................. B82Y 30/00
2013/0022846 A1 1/2013 Liu et al.
(Continued)

FOREIGN PATENT DOCUMENTS

| CN | 102751525 A | 10/2012 |
|---|---|---|
| CN | 103094600 A | 5/2013 |
| JP | 2000-260461 A | 9/2000 |

(Continued)

OTHER PUBLICATIONS

Douglas Aaron, et al., "In Situ Kinetics Studies in All-Vanadium Redox Flow Batteries", ECS Electrochemistry Letters, 2013, pp. A29-A31, vol. 2.

(Continued)

*Primary Examiner* — Milton I Cano
*Assistant Examiner* — Mary G Henshaw
(74) *Attorney, Agent, or Firm* — Sughrue Mion, PLLC

(57) ABSTRACT

A redox flow battery is provided, including an ion-exchange membrane, a current collector plate, and an electrode that is disposed between the ion-exchange membrane and the current collector plate. The electrode includes a main electrode layer in which an electrolytic solution flows from a surface on the current collector plate side to a surface on the ion-exchange membrane side, and the main electrode layer includes a plurality of main electrode pieces which are arranged in parallel in a plane direction.

15 Claims, 5 Drawing Sheets

(56) References Cited

U.S. PATENT DOCUMENTS

2015/0236363 A1     8/2015   Polcyn et al.
2017/0288243 A1*   10/2017   Thomsen ............ H01M 8/0213

FOREIGN PATENT DOCUMENTS

| JP | 2003-157885 A | 5/2003 |
| JP | 2006-040591 A | 2/2006 |
| JP | 2006-156029 A | 6/2006 |
| JP | 2015-122231 A | 7/2015 |
| JP | 2015-530709 A | 10/2015 |
| JP | 5890561 B1 | 3/2016 |
| WO | 2015/111313 A1 | 7/2015 |
| WO | 2016/104613 A1 | 6/2016 |

OTHER PUBLICATIONS

International Search Report for PCT/JP2016/073128 dated Oct. 25, 2016 [PCT/ISA/210].
Extended European Search Report dated May 6, 2020, issued by the European Patent Office in application No. 16911665.4.

* cited by examiner (a)

(b)

REDOX FLOW BATTERY

BACKGROUND OF THE INVENTION

Field of the Invention

The present invention relates to a redox flow battery.
Priority is claimed on International Patent Application No. PCT/JP2016/073128, filed on Aug. 5, 2016, the content of which is incorporated herein by reference.

Description of Related Art

As a large-capacity storage battery, a redox flow battery is known. Typically, the redox flow battery includes an ion-exchange membrane configured to separate an electrolytic solution, and an electrode that is provided on both sides of the ion-exchange membrane. An oxidation reaction and a reduction reaction are simultaneously performed in the electrodes, and thus charging and discharging are performed.

In the redox flow battery, a reduction of internal resistance (cell resistance) and a reduction of a pressure loss when the electrolytic solution permeates through the electrodes are required so as to enhance energy efficiency of the entirety of the redox flow battery.

For example, Japanese Unexamined Patent Application, First Publication No. 2015-122231 discloses a configuration in which a groove that becomes a flow passage of the electrolytic solution is formed in a current collector plate to reduce a pressure loss. FIGS. 7A and 7B are views schematically illustrating a part of the redox flow battery on the basis of the description in Japanese Unexamined Patent Application, First Publication No. 2015-122231, FIG. 7A is a plan view and FIG. 7B is a cross-sectional view of a main portion that is cut along a plane X-X.

A redox flow battery illustrated in FIGS. 7A and 7B includes a first comb-like groove M1 that communicates with an inflow port, and a second comb-like groove M2 that communicates with an outflow port as a groove that becomes a flow passage of the electrolytic solution. An electrolytic solution, which is supplied from the inflow port illustrated on an upper-right side, flows as indicated by a reference numeral f1, and the first comb-like groove M1 is filled with the electrolytic solution. In addition, the electrolytic solution flows out to the second comb-like groove M2, flows along the second comb-like groove M2 as indicated by a reference numeral f2, and is discharged from the outflow port illustrated on a lower-left side. The reference numerals f1 and f2 illustrate a part of the flow. In the flow of the electrolytic solution from the first comb-like groove M1 to the second comb-like groove M2, as indicated by a reference numeral f3 in FIG. 7B, the electrolytic solution flows through the inside of an electrode E from the first comb-like groove M1, and flows into the second comb-like groove M2.

In the redox flow battery disclosed in Japanese Unexamined Patent Application, First Publication No. 2015-122231, the electrolytic solution flows through the inside of the electrode in an in-plane direction. In contrast, Published Japanese Translation No. 2015-530709 of the PCT International Publication discloses a configuration in which when the electrolytic solution flows through an electrode in an in-plane direction, it is possible to greatly reduce a pressure loss in comparison to flowing in a vertical direction.

SUMMARY OF THE INVENTION

As in the redox flow battery illustrated in FIGS. 7A and 7B, in a case of a configuration in which the electrolytic solution flows in from a current collector plate side of an electrode, passes through the inside of the electrode, and flows out to the current collector plate side of the electrode in the same manner, it is difficult for the electrolytic solution to uniformly flow to the entirety of the electrode. Referring to FIG. 7B, a portion D1 immediately above the first comb-like groove M1, and a portion D2 between the first comb-like groove M1 and the second comb-like groove M2 are different in a flow rate of the electrolytic solution. In the redox flow battery having the above-described configuration, it is difficult to uniformly supply the electrolytic solution to the entirety of the electrode E.

This represents that it is basically difficult to reach the maximum output density that is attained when the electrolytic solution is uniformly supplied to the entirety of the electrode, and thus there is a limitation to a reduction of the internal resistance (cell resistance).

Published Japanese Translation No. 2015-530709 of the PCT International Publication discloses that when the electrolytic solution flows through the electrode in a vertical direction, a pressure loss can be greatly reduced in comparison to flowing in an in-plane direction. However, with regard to a method of allowing the electrolytic solution to flow through the electrode in the vertical direction, only the following configuration is described. Specifically, an electrolytic solution inflow region is provided on an electrolytic solution inflow side of the electrode, and a closed end is provided at an end, which is opposite to an electrolytic solution supply portion, of the electrolytic solution inflow region (Paragraph [0044]). That is, the electrolytic solution, which flows in from the electrolytic solution supply portion, flows into the electrolytic solution inflow region, and the electrolytic solution can only flow into the electrode in the vertical direction because the end opposite to the electrolytic solution supply portion is closed. In addition, in Paragraph [0049] and Paragraph [0050], a pressure loss is compared between a case where the electrolytic solution flows through the electrode in the in-plane direction, and a case where the electrolytic solution flows through the electrode in the vertical direction by using an expression. However, in the comparison, the pressure loss is compared only on the basis of a length and a cross-sectional area in a direction in which the electrolytic solution flows through the inside of the electrode.

As in the redox flow battery disclosed in Japanese Unexamined Patent Application, First Publication No. 2015-122231, in a case of a redox flow battery (hereinafter, may be referred to as "in-plane flow type redox flow battery" or "in-plane flow type RFB") in a type in which the electrolytic solution flows through the electrode in the in-plane direction, there is a problem as described above. According to this, with respect to a configuration (hereinafter, may be also referred to as "vertical flow type redox flow battery" or "vertical flow type RFB") in which the electrolytic solution flows through the electrode in the vertical direction and a break-through possibility is provided in the redox flow battery, specific examination for realization is required.

However, in an electrode material of the redox flow battery, the larger a surface, the better a battery reactivity (an oxidation reaction and a reduction reaction). As the electrode material having a large surface area, Japanese Unexamined Patent Application, First Publication No. 2006-156029 discloses a configuration in which a vapor-phase method carbon fiber (carbon nanotube) having an average fiber diameter of 0.05 to 0.3 μm is used. The average fiber diameter of the carbon nanotube is approximately $1/100$ or less times an average diameter of a typical carbon fiber. In a case where the fiber forms a sheet, the size of a vacancy in the sheet is approximately 1/100 or less times the size of a vacancy of the typical carbon fiber. The electrode material using the carbon nanotube has a very dense structure, and thus electrolytic solution permeability is significantly poor. According to this, in the redox flow battery that uses a sheet using the carbon nanotube as a carbonaceous member, a high pressure loss occurs.

The present inventors have examined a specific configuration of a vertical flow type redox flow battery and an electrode material thereof with focus given to cell resistivity so as to attain availability of the new vertical flow type redox flow battery different from the in-plane flow type redox flow battery of the related art. Specifically, the present inventors have examined a relationship between various specific configurations and cell resistivity in the configurations in detail. As a result, the present inventors found a configuration in which cell resistivity lower than cell resistivity of the in-plane flow type redox flow battery of the related art is obtained, and they have accomplished the invention. The cell resistivity is a characteristic that directly leads to a current density in charging and discharging, and thus the invention leads to development of the vertical flow type redox flow battery.

The invention has been made in consideration of the above-described problem, and an object thereof is to provide a redox flow battery in which cell resistivity is low.

The invention provides the following configurations to solve the above-described problem.

(1) According to an aspect of the invention, a redox flow battery is provided, including: an ion-exchange membrane; a current collector plate; and an electrode that is disposed between the ion-exchange membrane and the current collector plate. The electrode includes a main electrode layer in which an electrolytic solution flows from a surface on the current collector plate side to a surface on the ion-exchange membrane side, and the main electrode layer includes a plurality of main electrode pieces which are arranged in parallel in a plane direction.

(2) In the redox flow battery according to (1), cell resistivity may be 0.7 Ω·cm² or less.

(3) In the redox flow battery according to (1) or (2), an electrolytic solution discharge passage may be provided between the main electrode pieces adjacent to each other.

(4) In the redox flow battery according to any one of (1) to (3), the current collector plate may include a plurality of flow passage networks which are formed in a surface on the electrode side and through which the electrolytic solution circulates, and the main electrode pieces may be respectively disposed on the plurality of flow passage networks.

(5) In the redox flow battery according to any one of (1) to (4), the main electrode pieces may include a carbon nanotube having an average fiber diameter of 1 m or less.

(6) In the redox flow battery according to any one of (1) to (5), the electrode may further include a liquid outflow layer that is disposed on the ion-exchange membrane side of the main electrode pieces.

(7) In the redox flow battery according to (6), when a sheet surface of the main electrode pieces is set as a reference surface, a Darcy's rule permeability in an in-plane direction in the liquid outflow layer may be greater than a Darcy's rule permeability in a normal direction of the conductive sheet.

(8) In the redox flow battery according to any one of (4) to (7), each of the plurality of flow passage networks may be surrounded by a peripheral edge wall, and may include a first flow passage and a second flow passage which are formed by an inner wall, the first flow passage may extend from a liquid inflow port that is formed on one end side of the peripheral edge wall toward a liquid outflow port formed on the other end side, and the second flow passage may communicate with the first flow passage and extend in a direction of intersecting the first flow passage.

(9) In the redox flow battery according to (6) or (7), the thickness of the liquid outflow layer may be 0.1 mm to 0.9 mm.

(10) In the redox flow battery according to any one of (1) to (9), each of the plurality of main electrode pieces may have a rectangular shape, and a length of a short side may be 5 mm to 70 mm.

(11) In the redox flow battery according to any one of (6), (7), and (9), the thickness of the liquid outflow layer may be 1/150 or more times the length of the short side of the main electrode pieces.

(12) In the redox flow battery according to (8), an end of each of the plurality of main electrode pieces may be placed on a top surface of the peripheral edge wall.

(13) In the redox flow battery according to any one of (1) to (12), an effective area ratio may be 60% or greater, and the effective area ratio may be (sum of effective electrode areas of the plurality of main electrode pieces)/{(sum of the areas of the plurality of main electrode pieces)+(sum of areas of portions between the plurality of main electrode pieces)}.

(14) In the redox flow battery according to any one of (1) to (13), the electrode may include the main electrode layer, a liquid outflow layer that is disposed between the main electrode layer and the ion-exchange membrane, and a liquid inflow layer that is disposed between the main electrode layer and a current collector.

(15) In the redox flow battery according to any one of (1) to (14), the current collector plate may include a peripheral edge wall, the liquid inflow layer may be disposed between parts of the peripheral edge wall, the main electrode layer may be placed on a top surface of the peripheral edge wall, and the liquid outflow layer may be disposed on the main electrode layer.

(16) In the redox flow battery according to any one of (1) to (15), the main electrode layer may be constituted by a conductive sheet including a carbon nanotube, and the liquid outflow layer may be constituted by a carbon felt including a carbon fiber, or carbon paper.

(17) In the redox flow battery according to any one of (1) to (16), the main electrode layer may be constituted by a conductive sheet including a carbon nanotube, and both of the liquid outflow layer and the liquid inflow layer may be constituted by a carbon felt including a carbon fiber, or carbon paper.

Advantageous Effects of the Invention

According to the redox flow battery of the invention, it is possible to provide a redox flow battery in which cell resistivity is low.

BRIEF DESCRIPTION OF THE DRAWINGS

FIG. 3A is a schematic cross-sectional view taken along line X-X in FIG. 2, and FIG. 3B is a schematic cross-sectional view taken along line Y-Y in FIG. 2;

FIG. 5A is a schematic cross-sectional view taken along line X-X in FIG. 2, and FIG. 5B is a schematic cross-sectional view taken along line Y-Y in FIG. 2;

FIG. 7A is a plan view of a groove that is provided in the redox flow battery described in Japanese Unexamined Patent Application, First Publication No. 2015-122231, and FIG. 7B is a cross-sectional view of a main portion cut along a plane X-X in FIG. 7A.

DETAILED DESCRIPTION OF THE INVENTION

Figure 1:
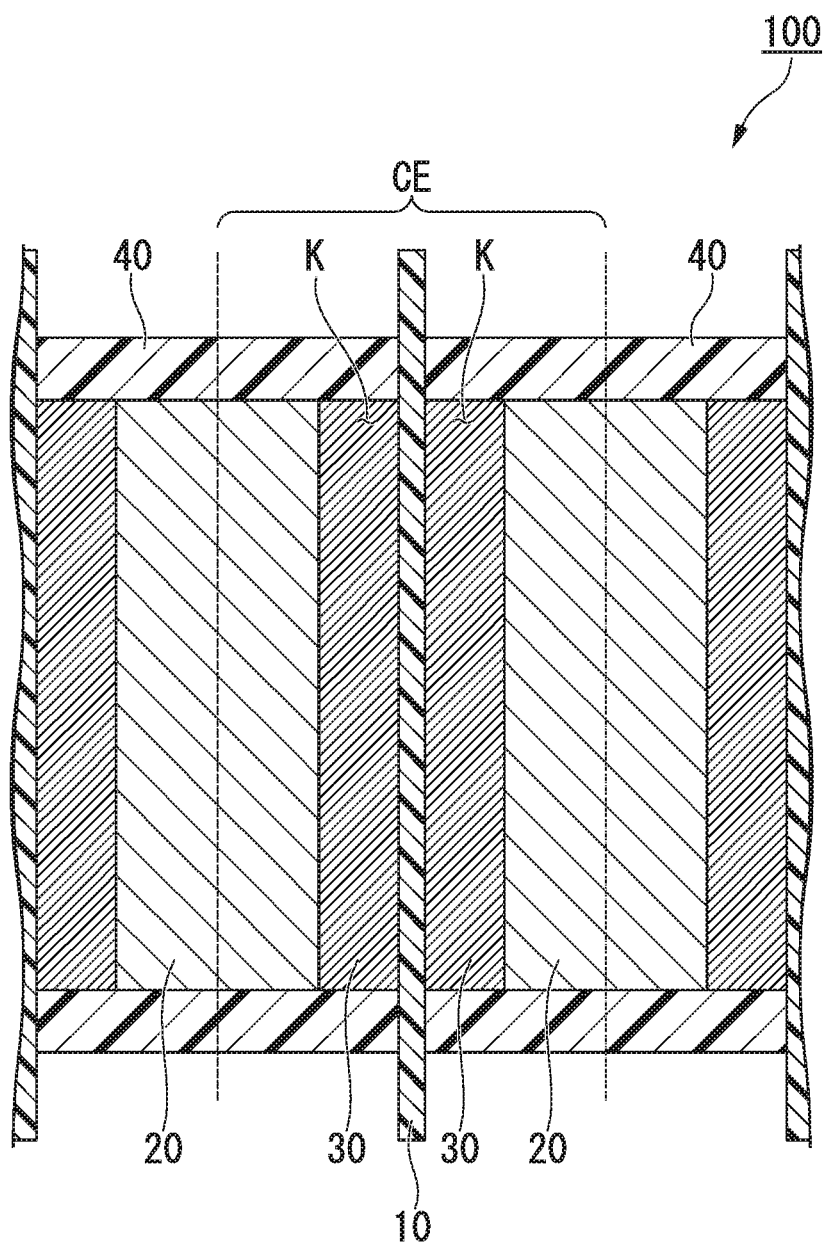
FIG. 1 is a schematic cross-sectional view of a redox flow battery according to an embodiment of the invention.

Hereinafter, a redox flow battery will be described in detail with reference to the accompanying drawings. In the drawings used in the following description, for convenience, characteristic portions may be enlarged for easy understanding of the characteristics of the invention, and dimensional ratios and the like of respective constituent elements may be different from actual dimensions. Materials, dimensions, and the like exemplified in the following description are illustrative only. The invention is not limited thereto, and approximate modifications can be made in a range exhibiting the effect of the invention.

First Embodiment

FIG. 1 is a schematic cross-sectional view of the redox flow battery according to a first embodiment.

A redox flow battery 100 illustrated in FIG. 1 includes an ion-exchange membrane 10, a current collector plate 20, and an electrode 30. Outer peripheries of the current collector plate 20 and the electrode 30 are surrounded by a cell frame 40. The electrode 30 is provided in an electrode chamber k that is formed by the ion-exchange membrane 10, the current collector plate 20, and the cell frame 40. The cell frame 40 prevents an electrolytic solution supplied to the electrode chamber k from being leaked to the outside.

The redox flow battery 100 illustrated in FIG. 1 has a cell stack structure in which a plurality of cells CE are stacked. The number of the cells CE stacked may be appropriately changed according to usage, and a single cell is also possible. When the plurality of cells CE are connected in series, a voltage in practical use is obtained. Each of the cells CE includes the ion-exchange membrane 10, two electrodes 30 which function as a positive electrode and a negative electrode with the ion-exchange membrane 10 interposed therebetween, and current collector plates 20 between which the two electrodes 30 are interposed.

Hereinafter, a stacking direction of the cell stack structure in which the cells CE are stacked may be referred to as "stacking direction", "plane-perpendicular direction", or "vertical direction", and a plane direction perpendicular to the stacking direction of the cell stack structure may be referred to as "in-plane direction".

Ion-Exchange Membrane

As the ion-exchange membrane 10, a positive ion-exchange membrane or a negative ion-exchange membrane can be used. Specific examples of the positive ion-exchange membrane include a perfluorocarbon polymer having a sulfonic acid group, a hydrocarbon-based polymer compound having a sulfonic acid group, a polymer compound doped with an inorganic acid such as phosphorous acid, an organic/inorganic hybrid polymer of which a part is substituted with a proton conductive functional group, and a proton conductor in which a polymer matrix is impregnated with a phosphoric acid solution or a sulfuric acid solution. Among these, the perfluorocarbon polymer having a sulfonic acid group is preferable, and Napion (registered trademark) is more preferable.

The thickness of the ion-exchange membrane is not particularly limited. For example, a thickness of 150 μm or less is appropriate in use. The thickness of the ion-exchange membrane is more preferably 120 μm or less, and still more preferably 60 μm or less.

Hereinafter, description of the embodiment will be given of a case of the positive ion-exchange membrane.

Current Collector Plate

The current collector plate 20 is a current collector that plays a role of delivering and receiving an electron to and from the electrode 30. In a case where both surfaces of the current collector plate 20 can be used as a current collector, the current collector plate 20 may be referred to as a "bipolar plate".

A material having conductivity may be used as the current collector plate 20. For example, a conductive material containing carbon can be used. Specific examples thereof include a conductive resin including graphite and an organic polymer compound, a conductive resin in which a part of graphite is substituted with at least one of carbon black and diamond-like carbon, and a shaped material obtained through kneading shaping of carbon and a resin. Among these, it is preferable to use the shaped material obtained through kneading shaping of carbon and a resin.

Figure 2:
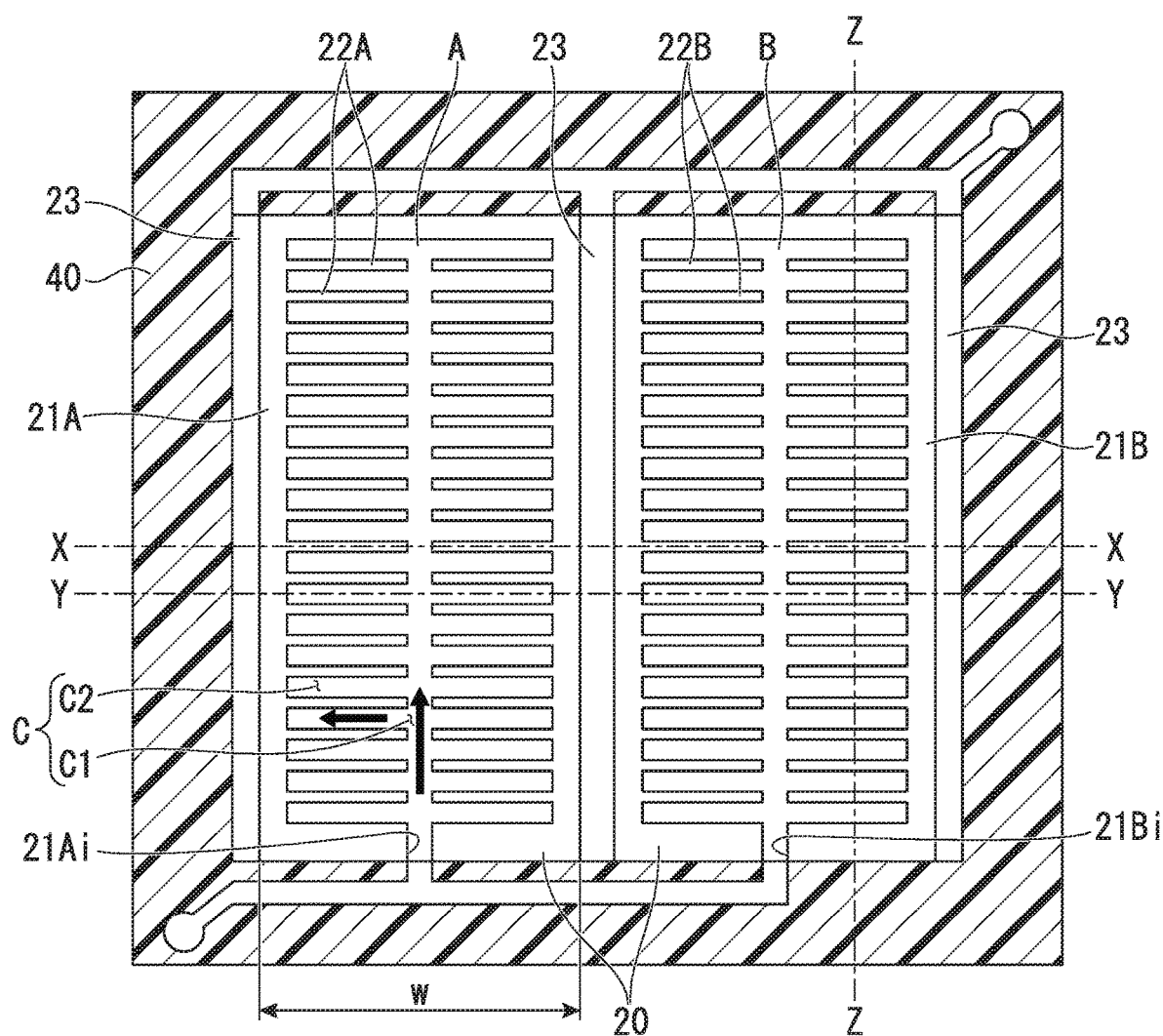
FIG. 2 is a schematic plan view when a current collector plate accommodated in a cell frame is seen from a stacking direction.

FIG. 2 is a schematic plan view when an example of the current collector plate 20 accommodated in the cell frame 40 is seen from the stacking direction. In addition, FIG. 3A is a schematic cross-sectional view taken along line X-X in FIG. 2, FIG. 3B is a schematic cross-sectional view taken along line Y-Y in FIG. 2.

In the invention, the current collector plate may be provided with a flow passage network which is formed in a surface on an electrode side and through which an electrolytic solution circulates, and a plurality of the flow passage networks may be provided. Here, the "flow passage network" is a flow passage pattern configured to define a flow of the electrolytic solution. "Two flow passage networks" illustrated in FIG. 2 and FIGS. 3A and 3B have a configuration in which flows of the electrolytic solution are separated between an inlet and an outlet by a peripheral edge wall, and the flows of the electrolytic solution are prevented from going and coming to and from the two "flow passage networks by the peripheral edge wall".

The current collector plate 20 illustrated in FIG. 2 and FIGS. 3A and 3B includes two flow passage networks A and B which are formed in surface on an electrode side, and through which the electrolytic solution circulates. It is preferable that the two flow passage networks A and B have the same configuration as illustrated in FIG. 2 and FIGS. 3A and 3B, but there is no limitation thereto. In the following description, description will be given of one side of the two flow passage networks A and B, and description of the other side may be omitted.

As illustrated in FIG. 2 and FIGS. 3A and 3B, the two flow passage networks A and B of the current collector plate 20 are respectively formed in peripheral edge walls 21A and 21B.

The electrolytic solution is supplied into concave portions 20A and 20B, which are respectively surrounded by the peripheral edge walls 21A and 21B, from openings 21Ai and 21Bi of the peripheral edge walls 21A and 21B.

Inner walls 22A and 22B are provided in the concave portions 20A and 20B surrounded by the peripheral edge walls 21A and 21B. The inner walls 22A and 22B form a flow passage C through which the electrolytic solution flows in an inflow portion. A shape of the flow passage C formed by the inner walls 22A and 22B is not particularly limited.

The inner walls 22A and 22B illustrated in FIG. 2 and FIGS. 3A and 3B form a first flow passage C1 in which the flow passage C extends from the openings 21Ai and 21Bi in one direction, and a second flow passage C2 that is connected to the first flow passage C1 and is branched from the first flow passage C1 in an intersecting direction. In the configuration, the electrolytic solution that is supplied flows along the first flow passage C1, and flows to be diffused to the second flow passage C2. That is, the electrolytic solution is likely to be uniformly diffused in an in-plane direction of the concave portions 20A and 20B. In FIG. 2, an arrow indicates a direction in which the electrolytic solution flows.

Figure 4:
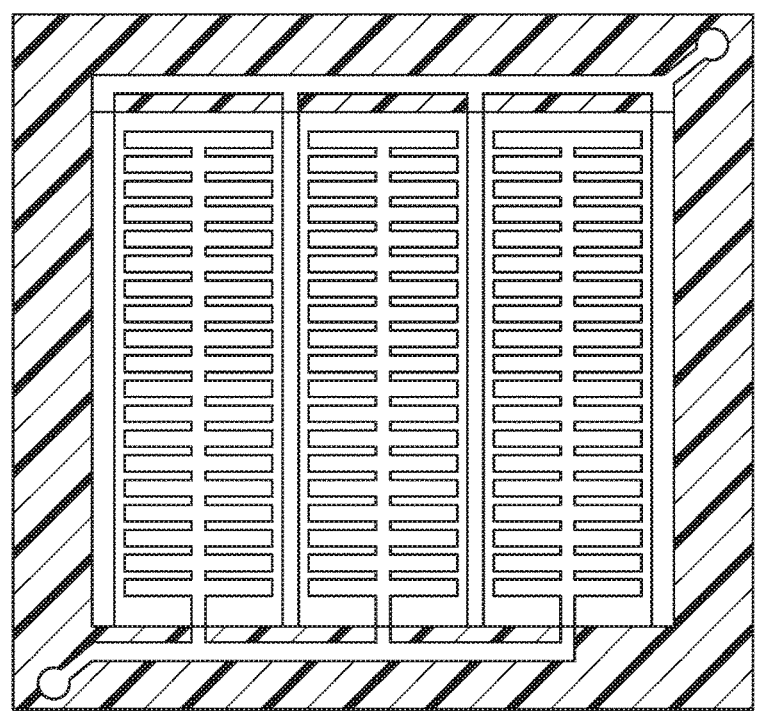
FIG. 4 is a schematic cross-sectional view of a redox flow battery according to another embodiment of the invention.

Here, in a case where a plurality of flow passage networks are provided, the current collector plate 20 is not limited to the configuration in FIG. 2. For example, as illustrated in FIG. 4, the current collector plate 20 may include three flow passage networks.

Discharge Passage

As illustrated in FIG. 2, a discharge passage 23 is disposed between main electrode pieces 31A and 31B adjacent to each other in planar view. The electrolytic solution, which passes through the electrode, is discharged through the discharge passage 23.

As described later, in a case where the main electrode pieces have a rectangular shape, the discharge passage 23 is preferably disposed between long sides of the main electrode pieces because it is possible to shorten a liquid-outflow-layer transmitting distance of the electrolytic solution. When the distance is shortened, it is possible to reduce a pressure necessary for the electrolytic solution to pass through the liquid outflow layer, or the thickness of the liquid outflow layer can be made to be smaller, thereby suppressing an increase in cell resistivity.

Electrode

The electrode of the invention includes a main electrode layer in which the electrolytic solution flows from a surface on the current collector plate side to a surface on the ion-exchange membrane side. The electrode of the invention may include an auxiliary layer configured to enhance a battery reaction that occurs in the main electrode layer on the current collector plate side or the ion-exchange membrane side although a battery reaction in the auxiliary layer is smaller in comparison to the battery reaction that occurs in the main electrode layer.

Figure 7:
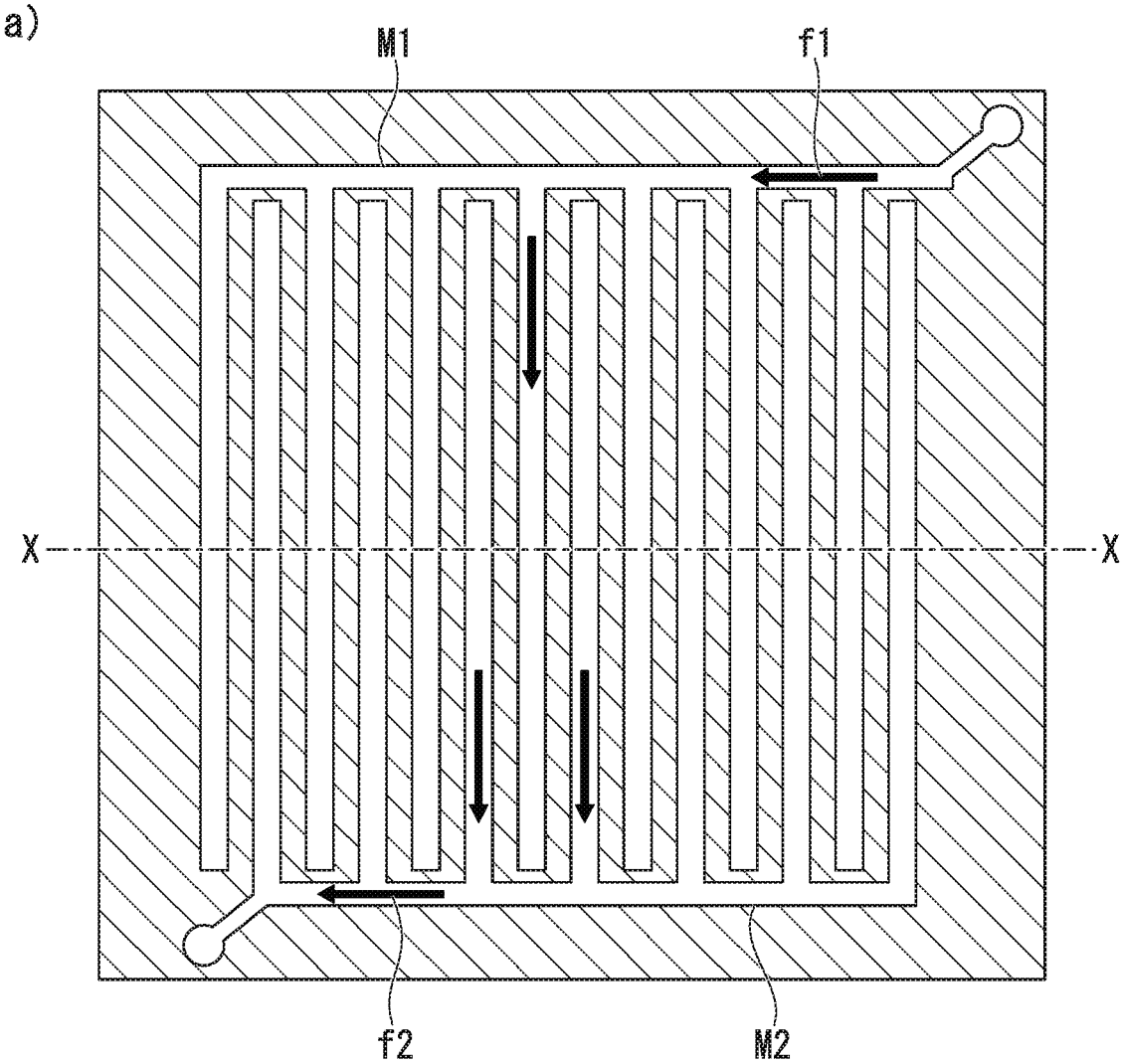
FIGS. 7A and 7B illustrate a part of a redox flow battery described in Japanese Unexamined Patent Application, First Publication No. 2015-122231, and in the drawings.
Figure 7:
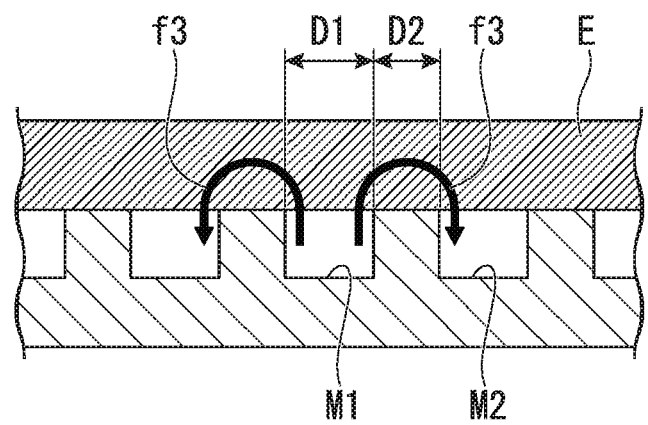

Here, "flowing of the electrolytic solution from the surface on the current collector plate side to the surface on the ion-exchange membrane side" relates to a flow type of the electrolytic solution in the electrode layer in an in-plane flow type redox flow battery (in-plane flow type RFB) as in FIGS. 7A and 7B and the like, and represents a flow type of the electrolytic solution in an electrode layer in a vertical flow type redox flow battery (vertical flow type RFB). Here, the "vertical flow" in the vertical flow type RFB represents neither a configuration in which the electrolytic solution does not flow at all in an in-plane direction in the electrode layer nor a configuration in which the electrolytic solution flows only in a plane-perpendicular direction of the electrode layer. The vertical flow type RFB is provided with a configuration in which the electrolytic solution is intended to flow in a plane-vertical direction of the electrode layer in a spirit different from the in-plane flow type RFB. Accordingly, with regard to "flowing of the electrolytic solution from the surface on the current collector plate side to the surface on the ion-exchange membrane side", it is sufficient when a configuration in which the electrolytic solution is intended to flow in the plane-perpendicular direction of the electrode layer is provided.

Figure 5:
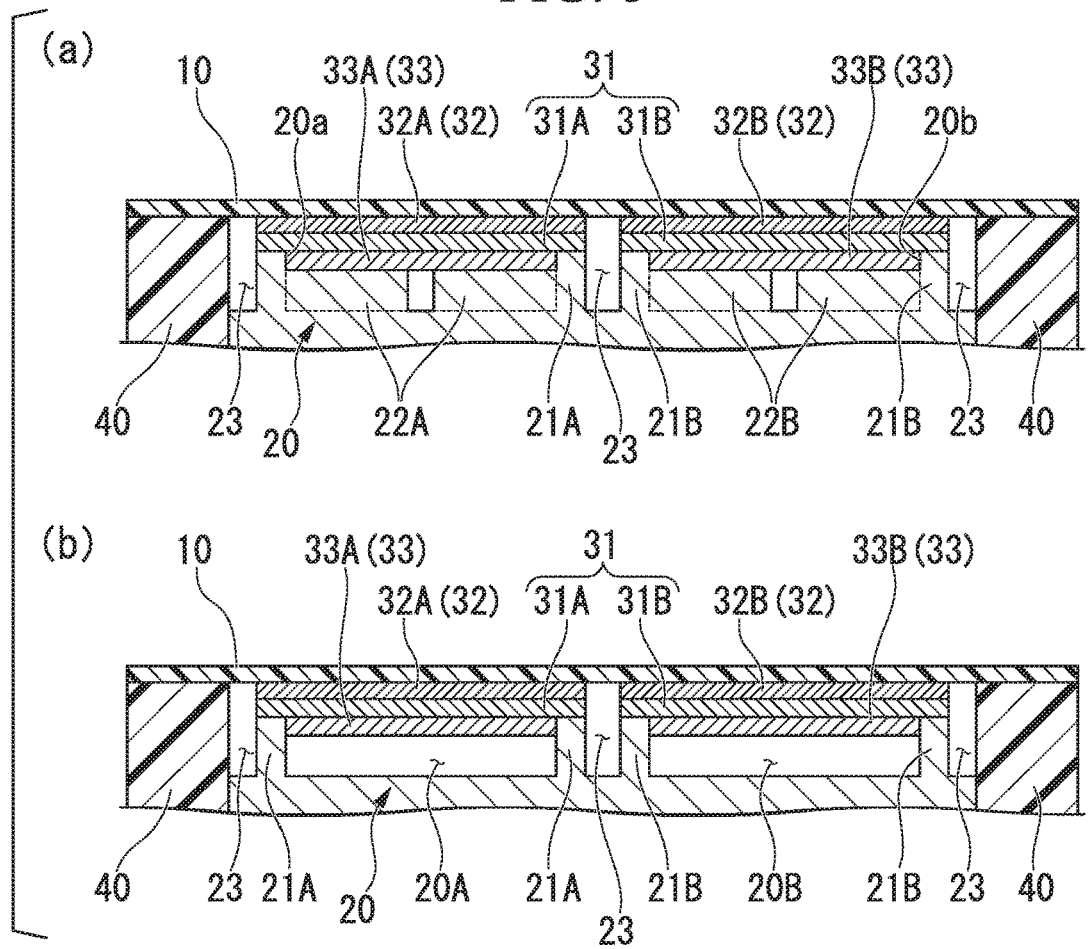
FIGS. 5A and 5B are schematic cross-sectional views of a redox flow battery according to an embodiment of the invention in which an electrode and an ion-exchange membrane are disposed on a current collector illustrated in FIG. 2 and FIG. 3, and in the drawings.

FIGS. 5A and 5B are schematic cross-sectional views of the redox flow battery according to the embodiment of the invention in which electrode is disposed on the current collector illustrated in FIG. 2 and FIGS. 3A and 3B. FIG. 5A is a schematic cross-sectional view taken along line X-X in FIG. 2, and FIG. 5B is a schematic cross-sectional view taken along line Y-Y in FIG. 2.

The electrode 30 illustrated in FIGS. 5A and 5B includes a main electrode layer 31, a liquid outflow layer 32, and a liquid inflow layer 33.

As described later, a carbonaceous porous material can be used for the liquid outflow layer and the liquid inflow layer. Accordingly, in this case, a battery reaction is allowed to occur, but a battery reaction which occurs in the liquid outflow layer is much smaller in comparison to a battery reaction that occurs in the main electrode layer due to a difference in a surface area and the like. The electrode may be constituted by a plurality of layers including the main electrode layer, but a battery reaction which occurs in a layer other than the main electrode layer is much smaller in comparison to a battery reaction that occurs in the main electrode layer.

The main electrode pieces of the invention represent electrode pieces obtained by dividing the main electrode layer into a plurality of pieces, and the main electrode layer is a general term for the main electrode pieces. Individual main electrode layers which are divided are referred to as "main electrode pieces". Accordingly, the main electrode layer includes a plurality of main electrode pieces which are arranged in parallel in a plane direction. The plurality of main electrode pieces may be respectively disposed on a plurality of flow passage networks.

The main electrode layer 31 illustrated in FIGS. 5A and 5B is disposed on each of the two flow passage networks A and B, and includes two main electrode pieces 31A and 31B which are arranged in parallel in a plane direction.

In a redox flow battery of the related art, a cell frame is provided with one flow passage network, and one electrode is disposed on the flow passage network. When the electrode is divided into two or more parts, an effective electrode area for occurrence of a battery reaction decreases. According to this, it is not considered that division is effective in the related art (as described later, when the electrode is divided, as illustrated in FIGS. 3A and 3B, the peripheral edge walls 21A and 21B are formed. In this case, an area of the main electrode layer through which the electrolytic solution passes decreases, and thus an area (hereinafter, may be referred to as "effective electrode area") that substantially contributes to the battery reaction decreases. In addition, hereinafter, a value obtained by dividing "a total of effective electrode area in a division case" by "effective electrode area in non-division case" may be referred to as "effective area ratio").

With respect to this, the present inventors have made a thorough investigation, and they found that cell resistivity in a configuration in which the electrode is divided into two or more parts further decreases in comparison to a case of a one-electrode configuration.

Here, the expression of "division" does not represent the nature of an operational effect of the decrease in the cell resistivity, but is a new spirit. Accordingly, for convenience, the expression of "division" is used from the viewpoint of easy explanation and understanding. The nature of the operational effect of the decreases in the cell resistivity will be clarified through the following description.

Referring to FIG. 2, FIGS. 3A and 3B, and FIGS. 5A and 5B, in the vertical flow type RFB of the invention, the electrolytic solution, which is supplied to the flow passage networks A and B from the openings 21Ai and 21Bi formed in the peripheral edge walls 21A and 21B, passes through the main electrode layer and is discharged to the ion-exchange membrane side. When a flow passage network is divided into a plurality of parts, a width w (refer to FIG. 2) of the flow passage network is also narrowed. Accordingly, when reaching the discharge passage, a flow distance of the electrolytic solution that passes through the main electrode layer is shortened. This represents that the electrolytic solution, which passes through the main electrode layer, is recovered to the discharge passage at relatively low flow passage resistance. In addition, in the liquid outflow layer, the electrolytic solution reaches the discharge passage after flowing in a plane direction, and thus if the thickness of the liquid outflow layer is small, the flow passage resistance is raised. However, when a flow distance along the liquid outflow layer in the plane direction is shortened, the flow passage resistance is lowered, and thus it is possible to reduce the thickness of the liquid outflow layer by the decrease in the flow passage resistance. When the thickness of the liquid outflow layer can be reduced, it is possible to make the main electrode layer be close to the ion-exchange membrane, and it is possible to shorten a migration distance of hydrogen ions. As a result, it leads to a decrease in the cell resistivity.

In the following description, an effect capable of recovering the electrolytic solution, which passes through the main electrode layer, in the discharge passage at relatively low flow passage resistance, or an effect of making the main electrode layer be close to the ion-exchange membrane may be referred to as "division effect".

FIG. 2, FIGS. 3A and 3B, and FIGS. 5A and 5B illustrate an example of the invention. The present inventors have obtained the following findings. If it is possible to further enhance the "division effect" against the effect due to a decrease in the effective electrode area in which a battery reaction occurs through division of the main electrode layer by a configuration in which a flow passage network is divided into a plurality of parts and the main electrode pieces are respectively disposed on the flow passage networks (that is, the main electrode is also divided into the same number of pieces), and a configuration in which an opening, through which the electrolytic solution is supplied to the flow passage networks, is formed in the peripheral edge wall that surrounds the flow passage networks, and the like, it is possible to decrease the cell resistivity.

Typically, those skilled in the art consider that when employing a configuration in which the main electrode layer is divided into a plurality of parts, and a discharge passage of the electrolytic solution is provided between the main electrode pieces adjacent to each other, and the like, the effective area of the main electrode layer decreases, and thus the cell resistivity increases.

The present inventors disregarded the related art and found a configuration in which the cell resistivity further decreases compared with cell resistivity before division in a case where the main electrode layer is divided into a plurality of parts, and have accomplished the invention.

In addition, when the flow passage networks are divided into a plurality of parts, the following effect is obtained. That is, when a plurality of the flow passage networks are provided, the width w (refer to FIG. 2) of the flow passage networks is narrowed. Accordingly, with regard to the electrolytic solution supplied to the flow passage network from the opening, when being diffused to the entirety of the flow passage networks, a flow distance of the electrolytic solution is shortened. This represents that the electrolytic solution, which is supplied to the flow passage network from the opening, is diffused to the entirety of flow passage networks at a faster speed.

According to the configuration of the redox flow battery of the invention, it is possible to set the cell resistivity to 0.7 $\Omega \cdot cm^2$ or less as illustrated in examples described later.

In the in-plane flow type RFB of the related art, the cell resistivity was approximately 0.8 to 1.7 $\Omega \cdot cm^2$ (for example, refer to D. Aaron et. al., ECS Electrochemistry Letters, 2(3) A29-A31 (2013)).

Furthermore, a method of calculating the cell resistivity will be described later.

Main Electrode Layer

As the main electrode layer 31, a conductive sheet including a carbon fiber can be used. The carbon fiber stated here is fiber-shaped carbon, and examples thereof include a carbon fiber, a carbon nanotube, and the like. When the electrode 30 includes the carbon fiber, a contact area between the electrolytic solution and the electrode 30 increases, and thus reactivity of the redox flow battery 100 is enhanced. Particularly, when including a carbon nanotube having a diameter of 1 μm or less, since a fiber diameter of the carbon nanotube is small, it is possible to enlarge the contact area, and thus this range is preferable. In addition, when including a carbon fiber having a diameter of 1 μm or greater, the conductive sheet is strong and is less likely to be fractured, and thus this range is preferable. As the conductive sheet including the carbon fiber, for example, a carbon felt, carbon paper, a carbon nanotube sheet, and the like can be used.

In a case where the main electrode layer 31 is constituted by the conductive sheet including the carbon nanotube having an average fiber diameter of 1 μm or less, the average fiber diameter of the carbon nanotube is preferably 1 to 300 nm, more preferably 10 to 200 nm, and still more preferably 15 to 150 nm. According to this, electrolytic solution permeability of the conductive sheet is very low in comparison to a carbon fiber felt that is typically used and is constituted by a carbon fiber, and the like. Accordingly, it is preferable that the liquid outflow layer 32 be provided on the ion-exchange membrane side. Details of the liquid outflow layer 32 will be described later.

The average fiber diameter of the carbon nanotube is obtained as follows. Diameters of 100 or more fibers are measured randomly for every kind of fiber with a transmission electron microscope, and an arithmetic value of the diameters is set as the average fiber diameter. This is also true of the following average fiber diameter. In this embodiment, in each carbon nanotube fiber, the average fiber diameter for every fiber is 1 µm or less.

The carbon nanotube included in the conductive sheet may be set to have a configuration in which a plurality of kinds of carbon nanotubes having different average fiber diameters are mixed. In this case, for example, it is preferable to include a first carbon nanotube having the average fiber diameter of 100 to 1000 nm and a second carbon nanotube having the average fiber diameter of 30 nm or less.

Furthermore, in a case of the configuration in which the plurality of kinds of carbon nanotubes having different average fiber diameters are mixed, a shaped conductive sheet is observed with a transmission electron microscope, and in the same visual field, a carbon nanotube having a fiber diameter of greater than 50 nm is regarded as the first carbon nanotube, and a carbon nanotube having a fiber diameter of less than 50 nm is regarded as the second carbon nanotube. In this state, the average fiber diameter is calculated as described above.

In addition, as to whether or not the carbon nanotube has the configuration in which the plurality of kinds of carbon nanotubes having different average fiber diameters are mixed, determination can be made by observing a shaped conductive sheet with a transmission electron microscope, by measuring the fiber diameter distribution in the same visual field, and by confirming whether or not two or more fiber diameter peaks exist in the distribution.

The average fiber diameter of the first carbon nanotube is preferably 100 to 300 nm, more preferably 100 to 200 nm, and still more preferably 100 to 150 nm. The average fiber diameter is preferably 0.1 to 30 µm, more preferably 0.5 to 25 µm, and still more preferably 0.5 to 20 µm.

The average fiber diameter of the second carbon nanotube is preferably 1 to 30 nm, more preferably 5 to 25 nm, and still more preferably 5 to 20 nm. The average fiber length is preferably 0.1 to 10 µm, more preferably 0.2 to 8 µm, and still more preferably 0.2 to 5 µm.

Furthermore, the average fiber length can be obtained as follows. Fiber lengths of 100 or more pieces of fibers are measured randomly for every fiber kind with a transmission electron microscope, and an arithmetic average value of the fiber lengths is set as the average fiber length.

It is preferable to have a structure in which at least a part of second carbon nanotubes is straddled over two or more first carbon nanotubes. The straddling structure can be confirmed, for example, through observation with a transmission electron microscope. When confirming a structure in which at least a part of second carbon nanotubes intersects two or more first carbon nanotubes, determination is made as "having the straddling structure".

It is not necessary for the "straddling structure" to be disposed with respect to the entirety of carbon nanotubes as long as the second carbon nanotube straddling over the first carbon nanotube is confirmed, for example, when photographing the electrode with a transmission electron microscope at a magnification of 100,000 times. A ratio of the second carbon nanotube having a structure of being straddled over two or more first carbon nanotubes is preferably 10% or greater, and more preferably 50% or greater.

For example, this ratio can be calculated by photographing the electrode with the transmission electron microscope at a magnification of 100,000 times, and by setting the second carbon nanotube, which is completely included in a photograph, to 100%. A second carbon nanotube of which an edge protrudes from the photograph is not used in the calculation.

When having the straddling structure, the conductive sheet can stably maintain a sheet shape without being scattered during a shaping process. In addition, due to the structure, a vacancy between the first carbon nanotubes which mainly provide conductivity can be filled with the second carbon nanotube, and thus it is possible to further enhance conductivity of the electrode. When the conductivity of the electrode is enhanced, it is possible to lower cell resistivity of the redox flow battery, and it is possible to increase electrical capacity.

In addition, when the average fiber diameter of the first carbon nanotube and the second carbon nanotube is in the above-described range, the conductive sheet has a structure capable of maintaining high strength and high conductivity. The reason for this is because the first carbon nanotube becomes a stem, and the second carbon nanotube is suspended in a branch shape between a plurality of the first carbon nanotubes. For example, when the average diameter of the first carbon nanotube is 100 nm or greater, the stem becomes stable, and cracking is less likely to occur in a structure of the electrode. As a result, it is easy to maintain sufficient strength. On the other hand, when the average diameter of the second carbon nanotube is 30 nm or less, the second carbon nanotube can be sufficiently intertangled with the first carbon nanotube, and thus conductivity is improved. That is, when using an electrode including a conductive sheet including two kinds of carbon nanotubes different in the average fiber diameter, it is possible to lower cell resistivity of the redox flow battery, and it is possible to increase electrical capacity.

It is more preferable to have a structure in which at least a part of the second carbon nanotubes is intertangled with two or more first carbon nanotubes. For example, the intertangling structure can be confirmed through transmission microscope observation. When it is possible to confirm a structure in which at least a part of the second carbon nanotubes is wound around the periphery of two or more first carbon nanotubes by one or more times, determination is made as "including the intertangling structure".

Furthermore, the same effect as in the straddling structure can be expected for the intertangling structure.

It is preferable that the second carbon nanotube be 0.05 to 30 parts by mass with respect to a total of 100 parts by mass of the first carbon nanotube and the second carbon nanotube, more preferably 0.1 to 20 parts by mass, and still more preferably 1 to 15 parts by mass. When the second carbon nanotube is contained in this range, the electrode has a structure capable of maintaining high strength and high conductivity. The reason for this is considered to be because when the second carbon nanotube is contained in this range, the first carbon nanotube functions as a main conductive material, and the second carbon nanotube electrically connects the first carbon nanotubes to efficiently support conduction.

Furthermore, a ratio of the second carbon nanotube to the total of 100 parts by mass of the first carbon nanotube and the second carbon nanotube may be obtained as follows. Specifically, a shaped conductive sheet is observed with a transmission electron microscope. In the same visual field, a carbon nanotube having a fiber diameter of greater than 50 nm is regarded as the first carbon nanotube, and a carbon nanotube having a fiber diameter of less than 50 nm is regarded as the second carbon nanotube. Conversion into a mass from the number and the size may be made on the assumption that the first carbon nanotube and the second carbon nanotube have the same density.

In addition, in a case where the ratio between the first carbon nanotube and the second carbon nanotube is in the above-described range, the "straddling structure" and the intertangling structure" are likely to be formed. According to this, as described above, it is possible to expect the effects such as a decrease in the cell resistivity and an increase in the electrical capacity.

The conductive sheet may include a conductive material other than the carbon nanotube. Specific examples of the conductive material include a conductive polymer, graphite, a conductive carbon fiber, and the like. It is preferable to include the conductive carbon fiber from viewpoints of acid resistance, oxidation resistance, and ease of mixing with the carbon nanotubes. Volume resistivity of the carbon fiber is preferably $10^7$ Ω·cm or less, and more preferably $10^3$ Ω·cm or less. The volume resistivity of the carbon fiber can be measured by a method described in Japanese Industrial Standard JIS R7609: 2007. In the conductive sheet, when a total amount of the carbon nanotube and the conductive material other than the carbon nanotube is set to 80% by mass or greater, it is possible to further increase conductivity of the electrode, and thus this range is preferable.

The average fiber diameter of the carbon fiber included in the conductive sheet is preferably 1 µm or greater. When using a carbon fiber having the average fiber diameter greater than the carbon nanotube, it is possible to form a relatively large vacancy in the conductive sheet, and it is possible to reduce a pressure loss when the electrolytic solution permeates through the electrode. In addition, it is also possible to expect an effect such as an improvement of conductivity and strength of the sheet. With regard to a structure of the carbon nanotube and the carbon fiber, it is preferable to have a structure in which the carbon nanotube adheres to a surface of the carbon fiber, and the carbon nanotube is straddled over a plurality of the carbon fibers. In this case, it is possible to reduce a pressure loss when the electrolytic solution permeates through the electrode, and satisfactory conductivity is provided, and thus the structure is preferable. The average fiber diameter of the carbon fiber is preferably 2 to 100 µm, and more preferably 5 to 30 µm. The average fiber length is preferably 0.01 to 20 mm, more preferably 0.05 to 8 mm, and still more preferably 0.1 to 1 mm.

The amount of the carbon fiber included in the conductive sheet is preferably 95 parts by mass or less with respect to a total of 100 parts by mass of the carbon nanotube and the carbon fiber included in the conductive sheet. In this case, it is possible to obtain an electrode of the redox flow battery in which a pressure loss when the electrolytic solution permeates through the electrode is small, and thus the range is preferable. The amount of the carbon fiber included in the conductive sheet is more preferably 90 parts by mass or less with respect to the total of 100 parts by mass of the carbon nanotube and the carbon fiber included in the conductive sheet, and still more preferably 85 parts by mass or less.

The conductive sheet may include a water-soluble conductive polymer. The water-soluble conductive polymer is preferable when considering that a surface of the carbon nanotube can be hydrophilized and a pressure loss when the electrolytic solution permeates through the electrode decreases. As the water-soluble conductive polymer, a conductive polymer including a sulfo group can be used preferably, and specific examples thereof include polyisothianaphthene sulfonic acid.

An addition amount of the water-soluble conductive polymer is preferably 5 parts by mass or less with respect to the total of 100 parts by mass of the carbon nanotube and the carbon fiber included in the conductive sheet, more preferably 4 parts by mass or less, and still more preferably 1 part by mass or less. In a case where the conductive sheet is obtained by filtering a dispersed solution including the carbon nanotube and the carbon fiber, the water-soluble conductive polymer is contained, typically, in the amount of 5 parts by mass or less.

The thickness of the conductive sheet before being embedded in a battery is preferably 0.01 mm to 1 mm, more preferably 0.01 mm to 0.8 mm, and still more preferably 0.02 mm to 0.5 mm. Conductivity becomes satisfactory in a thickness of 0.01 mm or greater, and satisfactory liquid permeability is obtained in a thickness of 1 mm or less, and thus this range is preferable.

Each of the plurality of main electrode pieces which constitute the main electrode layer has a rectangular shape, and a length (width) of a short side can be set to 5 mm to 70 mm.

When the width (representing "a width of an effective electrode area") of the main electrode piece is set to 5 mm to 70 mm, it is possible to lower flow passage resistance of the electrolytic solution. When the thickness of the liquid outflow layer as described later is 0.1 to 0.4 mm, the width of the main electrode piece is more preferably a range of 10 mm to 50 mm, still more preferably a range of 10 mm to 40 mm, and still more preferably a range of 15 mm to 35 mm. In addition, when the thickness of the liquid outflow layer as described later is greater than 0.4 mm and equal to or less than 1 mm, the width of the main electrode piece is more preferably a range of 10 mm to 60 mm, still more preferably a range of 20 mm to 50 mm, and still more preferably a range of 20 mm to 40 mm.

In addition, when the thickness of the liquid outflow layer is 0.1 to 0.4 mm, the effective area ratio is preferably 60% or greater, still more preferably 85% or greater, and still more preferably a range of 85% to 95%. In addition, when the thickness of the liquid outflow layer is greater than 0.4 mm and equal to or less than 1 mm, the effective area ratio is preferably 60% or greater, more preferably 85% or greater, and still more preferably a range of 85% to 95%.

Liquid Outflow Layer

The liquid outflow layer 32 is a member that is provided to allow the electrolytic solution, which passes through the main electrode layer 31, to flow out to the outside of the electrode 30.

The liquid outflow layer 32 illustrated in FIGS. 5A and 5B has a divided configuration (configuration including a plurality of elements), but may be configured as one sheet over the entirety of the cells.

The liquid outflow layer 32 has a configuration in which the electrolytic solution is easier to flow in comparison to the main electrode layer 31. Flowing ease of the electrolytic solution can be evaluated by a Darcy's rule permeability. The Darcy's rule is used to indicate permeability of a porous medium, but is also applied to members other than the porous material in the invention for convenience. At this time, with respect to a non-uniform and anisotropic member, permeability in a direction, in which the lowest permeability is obtained, is employed.

The Darcy's rule permeability (hereinafter, may be simply referred to as "permeability") in the liquid outflow layer 32 is preferably, for example, 50 or more times the permeability of the main electrode layer 31, and more preferably 100 or more times. Here, the Darcy's rule permeability k ($m^2$) is calculated from a cross-sectional area S ($m^2$) of a member through which a liquid having viscosity µ (Pa·sec) permeates, a length L (m) of the member, and a differential pressure ΔP (Pa) between a liquid inflow side and a liquid outflow side of the member when a liquid passes therethrough in a flow rate of Q (m³/sec) by using a relationship of a liquid permeation flux (m/sec) expressed by the following expression. Furthermore, in a case where the inside of the liquid outflow member is an empty space, in a state of being attached to the electrode 30, a cross-sectional area perpendicular to a permeation direction through the space is defined as "cross-sectional area S of a member through which a liquid permeates".

[Expression 1]

$$\frac{Q}{S} = \frac{k}{\mu} \times \frac{\Delta P}{L} \quad (1)$$

The permeability in the liquid outflow layer 32 is permeability in an in-plane direction (direction parallel to a sheet surface) with the sheet surface of the main electrode layer 31 set as a reference, and the permeability of the main electrode layer 31 is permeability in a normal direction (direction perpendicular to the sheet surface) with the sheet surface of the main electrode layer 31 set as a reference.

In a case where the permeability in the liquid outflow layer 32 is sufficiently higher than the permeability of the main electrode layer 31, the electrolytic solution that passes through the main electrode layer 31 does not stay on an outflow side, and is rapidly discharged to the outside of the electrode 30. The expression of "the electrolytic solution does not stay in the liquid outflow layer 32" represents that a pressure necessary for the electrolytic solution to pass through the liquid outflow layer 32 is sufficiently lower than a pressure necessary for the electrolytic solution to pass through the main electrode layer 31. That is, when the permeability of the main electrode layer 31 and the liquid outflow layer 32 satisfy the above-described relationship, in a case where a flow of the electrolytic solution that passes through the main electrode layer 31 faces a direction perpendicular to the surface of the main electrode layer 31, the electrolytic solution can be discharged to the outside of the electrode 30 after passing through the inside of the liquid outflow layer 32 without disturbing a flow in a vertical direction in the main electrode layer 31.

The thickness of the liquid outflow layer 32 (before being embedded) can be set to 0.1 mm to 0.9 mm. The thickness of the liquid outflow layer has a great effect on the cell resistivity. When the thickness of the liquid outflow layer is set to 0.1 mm to 0.9 mm, it is easy to pack the redox flow battery having lower cell resistivity in comparison to the related art.

On the other hand, when the thickness of the liquid outflow layer 32 after being embedded is increased, it is possible to further reduce a pressure necessary for the electrolytic solution to pass through the liquid outflow layer 32.

The thickness of the liquid outflow layer 32 after being embedded is preferably 0.08 mm or greater, more preferably 0.1 mm to 0.7 mm, and still more preferably 0.15 to 0.5 mm. When the thickness is 0.08 mm or greater, it is possible to reduce the pressure necessary for the electrolytic solution to pass through the liquid outflow layer 32, and thus this range is preferable. In addition, when the thickness is 0.7 mm or less, it is possible to suppress an increase in cell resistivity, and thus this range is preferable.

The thickness of the liquid outflow layer 32 can be set to 1/150 or more times the short-side length (width) of the main electrode piece. When the thickness of the liquid outflow layer decreases, it is necessary to shorten the short-side length, but when the thickness of the liquid outflow layer 32 is set to 1/150 or more times the short-side length (width) of the main electrode piece, it is possible to cope with the necessity.

On the other hand, the thickness of the liquid outflow layer 32 can be set to 1/20 or less times of the short-side length (width) of the main electrode piece. When the thickness of the liquid outflow layer 32 is set to 1/20 or less times the short-side length (width) of the main electrode piece, it may be easy to pack the redox flow battery having lower cell resistivity in comparison to the related art.

In addition, in the electrolytic solution after passing through the main electrode layer 31, a ratio occupied by an electrolytic solution after an oxidation reaction or a reduction reaction occurs is high. As described above, the electrolytic solution is allowed to rapidly flow out, and thus it is possible to efficiently remove ions after valence variation from the vicinity of the main electrode layer 31. Accordingly, it is possible to enhance reactivity. For example, in a case of using an electrolytic solution that includes vanadium, in the course of charging, $V^{4+}$ varies into $V^{5+}$ in a positive electrode, and $V^{3+}$ varies into $V^{2+}$ in a negative electrode. According to this, when efficiently removing the ions ($V^{5+}$ and $V^{2+}$) after the reaction, it is possible to rapidly supply the ions ($V^{4+}$ and $V^{3+}$) before the reaction to the conductive sheet, and thus ions before the reaction and ions after the reaction are efficiently substituted with each other. As a result, it is possible to enhance reaction efficiency. In the course of discharging, the valence variation of ions is inverted. However, as in the course of charging, the ions before the reaction and the ions after reaction are efficiently substituted with each other, and thus it is possible to enhance reaction efficiency.

There is no particular restriction to a specific aspect of the liquid outflow layer 32 as long as the permeability of the liquid outflow layer 32 and the permeability of the main electrode layer 31 have the above-described relationship. The liquid outflow layer 32 may be an outer frame that is disposed between the main electrode layer 31 and the ion-exchange membrane 10, and is provided with a liquid outflow port through which the electrolytic solution is discharged to the outside of the electrode 30. In a case where the liquid outflow layer 32 is constituted by the outer frame as described above, the electrolytic solution circulates in a space surrounded by the main electrode layer 31, the ion-exchange membrane 10, and the outer frame. The "permeability in the liquid outflow layer 32" in this case represents permeability of a portion that is constituted by the space formed by the outer frame and the liquid outflow port formed in the outer frame in an in-plane direction instead of permeability of the member that constitutes the outer frame. Furthermore, the outer frame does not mean a frame that is formed at the outermost portion. In addition, an enclosure (such as a casing) by an additional member may be additionally provided on an outer side of the outer frame.

It is preferable that the liquid outflow layer 32 be constituted by a porous sheet (first porous sheet). In this case, the liquid outflow port corresponds to a plurality of holes which exist in a lateral surface of the first porous sheet. When the liquid outflow layer 32 is constituted by the first porous sheet, the liquid outflow layer 32 functions as a buffering material between the main electrode layer 31 and the ion-exchange membrane 10. According to this, it is possible to suppress damage from occurring in the ion-exchange membrane 10, and it is possible to stably support the main electrode layer 31. The "permeability in the liquid outflow layer 32" in this case represents permeability in an in-plane direction of the entirety of the first porous sheet.

The first porous sheet may be a sponge-shaped member having vacancies, or a member formed through intertangling of fibers. For example, fabric obtained by weaving relatively long fibers, a felt obtained by intertangling fibers without being woven, paper made into a sheet shape from relatively short fibers, and the like can be used. In a case where the first porous sheet is constituted by fibers, it is preferable that the first porous sheet be constituted by fibers having an average fiber diameter of greater than 1 μm. When the average fiber diameter of the first porous sheet is 1 μm or greater, it is possible to sufficiently secure permeability of the electrolytic solution in the first porous sheet.

It is preferable that the first porous sheet not be corroded by the electrolytic solution. Specifically, in the redox flow battery, an acidic solution is used in many cases. According to this, it is preferable that the first porous sheet have acid resistance. In addition, oxidation due to a reaction is also considered, and thus it is preferable to have oxidation resistance. In a case where the porous sheet has the acid resistance or the oxidation resistance, the porous sheet after use enters a state of maintaining a shape thereof.

For example, a fiber formed from a polymer or glass that has the acid resistance is preferable. As the polymer, a fiber formed from at least one of a fluorine-based resin, a fluorine-based elastomer, polyester, an acrylic resin, polyethylene, polypropylene, polyarylate, polyether ether ketone, polyimide, and polyphenylene sulfide is preferably used. From the viewpoint of the acid resistance, a fluorine-based resin, a fluorine-based elastomer, polyester, an acrylic resin, polyethylene, polypropylene, polyether ether ketone, polyimide, and polyphenylene sulfide are more preferable. Form the viewpoint of the oxidation resistance, a fluorine resin, a fluorine-based elastomer, polyethylene, polyether ether ketone, and polyphenylene sulfide are more preferable. From the viewpoint of heat resistance, a fluorine resin, a fluorine-based elastomer, polyester, polypropylene, polyarylate, polyether ether ketone, polyinmide, and polyphenylene sulfide are more preferable.

In addition, it is preferable that the first porous sheet have conductivity. Here, the conductivity represents conductivity in which volume resistivity is preferably $10^7$ Ω·cm or less, and more preferably approximately $10^3$ Ω·cm or less. When the first porous sheet has conductivity, it is possible to raise electrical conductivity in the liquid outflow layer 32. For example, in a case of forming the first porous sheet by using fibers formed from a material having conductivity, a fiber formed from a metal or an alloy that has acid resistance and oxidation resistance, or carbon fiber can be used. Examples of the fiber of the metal or the alloy include fibers including titanium, zirconium, platinum, and the like. Among these, it is preferable to use carbon fiber.

Furthermore, in a case where the main electrode layer 31 is constituted by a conductive sheet including the carbon nanotube, as the first porous sheet (liquid outflow layer 32), a carbon felt including carbon fibers, or carbon paper is preferable. The carbon nanotube may be peeled off from the main electrode layer 31 in operation for a long time. The carbon nanotube is very hard. Accordingly, when the carbon nanotube circulates inside a battery in combination with the electrolytic solution, there is a concern that a pump and the like may be damaged. In addition, from the viewpoint of stability, management relating to nanomaterial is strict, and thus it is not preferable that the carbon nanotube be leaked to the outside of the electrode 30. Here, when the liquid outflow layer 32 constituted by the carbon felt or the carbon paper is located between the ion-exchange membrane 10 and the main electrode layer 31, the liquid outflow layer 32 functions as a filter, and traps the carbon nanotube peeled off from the main electrode layer 31 by using affinity with the carbon nanotube. As a result, it is possible to prevent the carbon nanotube from being leaked to the outside from the electrode 30.

Liquid Inflow Layer

The liquid inflow layer 33 may be interposed between the current collector 20 and the main electrode layer 31. It is preferable that the liquid inflow layer 33 be surrounded by the peripheral edge wall 21. It is preferable that the liquid inflow layer 33 have a Darcy's rule permeability higher than that of the main electrode layer 31. The permeability in the liquid inflow layer 33 is preferably 50 or more times the permeability of the main electrode layer 31, and more preferably 100 or more times. Here, the permeability in the liquid inflow layer 33 is measured by the same method of measuring the Darcy's rule permeability in the liquid outflow layer 32.

In a case where the permeability in the liquid inflow layer 33 is sufficiently higher than the permeability of the main electrode layer 31, the electrolytic solution, which flows into the liquid inflow layer 33, is blocked by the main electrode layer 31 having low permeability, and is diffused to entire surfaces in the liquid inflow layer 33, and thus a pressure in the liquid inflow layer 33 becomes uniform. According to this, the electrolytic solution, which passes through the liquid inflow layer 33, flows in a more uniform and more vertical manner with respect to the surface of the main electrode layer 31, and thus a pressure loss is reduced.

It is preferable that the thickness of the liquid inflow layer be a thickness capable of being accommodated in accommodation portions 20a and 20b without protruding. It is more preferable that the thickness be the same as the height of the accommodation portions 20a and 20b.

For example, the materials described in the liquid outflow layer 32 can be used as the liquid inflow layer 33. Among these, the sheet having conductivity is preferable from the viewpoint of transferring a charge variation that occurs in the main electrode layer 31 in the course of charging and discharging to the current collector 20, and the viewpoint of suppressing cell resistance from increasing.

Furthermore, in a case where the main electrode layer 31 is constituted by a conductive sheet including the carbon nanotube, it is preferable that the liquid inflow layer 33 be constituted by a carbon felt including carbon fibers or carbon paper. In this case, even when abnormality such as a reverse flow occurs, the liquid inflow layer 33 functions as a filter, and thus it is possible to prevent the carbon nanotube from flowing out to the outside from the electrode 30.

Figure 3:
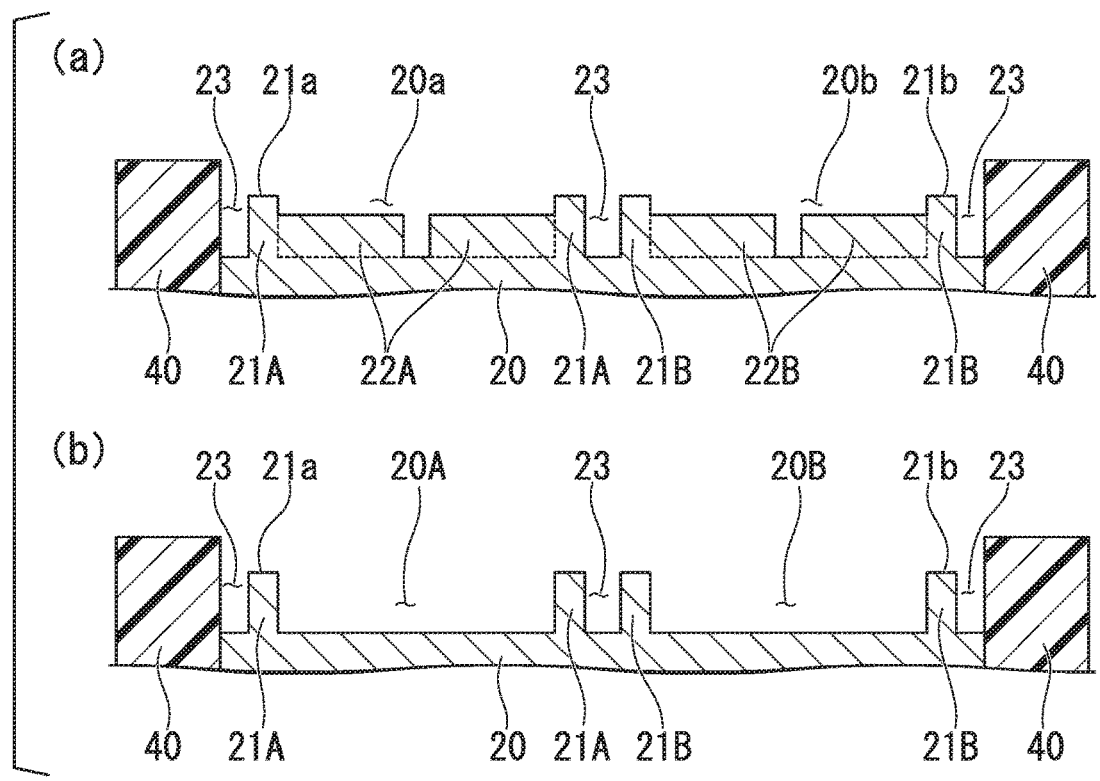
FIGS. 3A and 3B are schematic cross-sectional views of the current collector plate in FIG. 2, and in the drawings.

In the redox flow battery illustrated in FIGS. 5A and 5B, ends of the main electrode layers 31A and 31B are respectively placed on the top surfaces 21a and 21b of the peripheral edge walls 21A and 21B of the current collector plate (refer to FIGS. 3A and 3B). In a case of a configuration in which the main electrode layers 31A and 31B are fit into the accommodation portions 20a and 20b, the electrolytic solution short-circuits between the main electrode layer and an inner surface of a peripheral edge portion, and may flow out to the discharge passage 23 (refer to FIG. 3) without passing through the main electrode layer. As described above, the electrolytic solution, which flows out to the discharge passage 23 (refer to FIGS. 3A and 3B) without passing through the main electrode piece, is discharged in a non-reaction state, and thus this leads to an increase in cell resistivity. In contrast, as in the redox flow battery illustrated in FIGS. 5A and 5B, in a configuration in which the ends of the main electrode layers 31A and 31B are respectively placed on the top surfaces 21a and 21b (refer to FIGS. 3A and 3B) of the peripheral edge walls 21A and 21B of the current collector plate, a short-circuit passage is not formed, and the electrolytic solution passes through the main electrode layer to cause a battery reaction to occur. In addition, the main electrode layer is a portion in which the electrolytic solution flows from a surface on the current collector plate side to a surface on the ion-exchange membrane side, and portions which are placed on the top surfaces 21a and 21b are not included when considering electrochemical meaning (a width of the main electrode piece, an effective area ratio, and the like). However, in this paragraph, for ease of explanation of the structure, it is assumed that the portions placed on the top surfaces 21a and 21b are also included in the main electrode layer.

Flow of Electrolytic Solution

Figure 6:
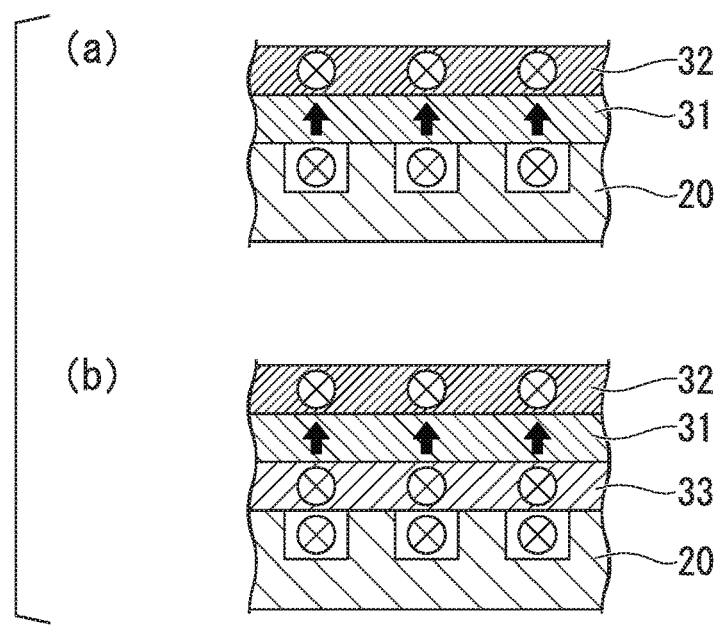
FIGS. 6A and 6B are schematic views illustrating a flow of an electrolytic solution of the redox flow battery of the invention, and correspond to a schematic cross-sectional view taken along line Z-Z in FIG. 2.

FIGS. 6A and 6B are schematic views illustrating a flow of the electrolytic solution of the redox flow battery of the invention, and are schematic cross-sectional views taken along line Z-Z in FIG. 2.

FIG. 6A illustrates a configuration in which the main electrode layer 31 and the liquid outflow layer 32 are provided between the current collector 20 and the ion-exchange membrane (refer to FIGS. 5A and 5B). FIG. 6B illustrates a case where the liquid inflow layer 33, the main electrode layer 31, and the liquid outflow layer 32 are provided between the current collector 20 and the ion-exchange membrane (refer to FIGS. 5A and 5B).

As illustrated in FIG. 6A, the electrolytic solution, which enters the flow passage network of the current collector 22, is rapidly diffused in an in-plane direction, and passes through the main electrode layer 31 in a plane-perpendicular direction. Then, the electrolytic solution enters the liquid outflow layer 32, proceeds in an in-plane direction, and is recovered to the discharge passage.

As illustrated in FIG. 6B, the electrolytic solution, which enters the flow passage network of the current collector 22, is rapidly diffused in an in-plane direction, and enters the liquid inflow layer 33. Even in the liquid inflow layer 33, the electrolytic solution passes through the main electrode layer 31 in a plane-perpendicular direction in a state of being diffused in the in-plane direction. Then, the electrolytic solution enters the liquid outflow layer 32, proceeds in the in-plane direction, and is recovered to the discharge passage.

Calculation of Cell Resistivity

The cell resistivity [$\Omega \cdot cm^2$] is calculated by the following Expression (1) by using a midpoint rule after obtaining charging and discharging curves by performing charging and discharging. Charging and discharging are performed with the same current.

$$\rho_{s,cell} = S \times (V_1 - V_2)/(2 \times I) \quad (1)$$

Here, $\rho_{s,cell}$: Cell resistivity [$\Omega \cdot cm^2$]
S: Electrode area [$cm^2$]
$V_1$: Midpoint voltage [V] of a charging curve
$V_2$: Midpoint voltage [V] of a discharging curve
I: Charging and discharging current [A]

The calculation method will be described in more detail.

In the charging and discharging curves, the charging curve is located on an upper side, and the discharging curve is located on a lower side. This is caused by battery internal resistance. That is, in discharging, a voltage, which corresponds to a voltage drop (over-voltage) corresponding to battery internal resistance with respect to an open end voltage (voltage when a current does not flow), becomes a discharging voltage. On the other hand, in charging, a voltage, which corresponds to a voltage rise (over-voltage) corresponding to the battery internal resistance with respect to the open end voltage, becomes a charging voltage. These relationships are expressed by the following expressions.

$$\text{Charging voltage}(V) = \text{open end voltage}(V) + \text{over-voltage}(V) \quad (1\text{-a})$$

$$\text{Discharging voltage}(V) = \text{open end voltage}(V) - \text{over-voltage}(V) \quad (1\text{-b})$$

$$\text{Over-voltage}(V) = \text{battery internal resistance}(\Omega) \times \text{charging and discharging current}(I) \quad (1\text{-c})$$

From Expressions (1-a) to (1-c),

A relationship of battery internal resistance ($\Omega$)={charging voltage (V)−discharging voltage (V)}/2×charging and discharging current (I) is obtained. Here, when the charging and discharging current (I) is set as a current density, an expression of cell resistivity [$\Omega \cdot cm^2$] is obtained.

Here, in the method of calculating the cell resistivity [$\Omega \cdot cm^2$] by the midpoint rule, the charging and discharging curves (the horizontal axis: electrical capacity (Ah), and the vertical axis: battery voltage (V)), a voltage ($V_1$) corresponding to ½ times charging capacity obtained from the charging curve is set as a charging voltage, and a voltage ($V_2$) corresponding to ½ times discharging capacity obtained from the discharging curve is set as a discharging voltage.

Cell resistivity illustrated in Examples is obtained by performing charging and discharging under charging and discharging conditions of a charging and discharging current density of 100 mA/$cm^2$, a charging termination voltage of 1.8 V, a discharging termination voltage of 0.8 V, and a temperature of 25° C.

Experiment Relating to Prevention of Flowing-Out of Carbon Nanotube

Measurement Method

In a case of using a main electrode including a carbon nanotube, an experiment relating to prevention of flowing-out of carbon nanotube is performed as follows. Charging and discharging are repetitively performed 1000 times under the same conditions as in calculation of the cell resistivity. Then, the electrolytic solution is drained, and the electrolytic solution after use is filtered by using a membrane filter having a hole diameter of 0.05 μm. 50 visual fields (visual field size: 1.2 μm×0.9 μm) of the membrane filter, which is used in the filtration, are photographed by using a SEM at a magnification of 100,000 times, and observation is performed to investigate the number of carbon nanotubes. In a case where the carbon nanotube or an aggregate of the carbon nanotube is not observed in the 50 visual fields, it is determined that prevention of flowing-out is achieved. That is, it is determined that it is effective for prevention of flowing-out of the carbon nanotube.

EXAMPLES

Hereinafter, Examples of the invention will be described. Furthermore, the invention is not limited to the following Examples.

First, results in a case where the main electrode layer of 50 mm (width)×50 mm (length) is divided (includes a plurality of main electrode pieces) (Examples 1 to 5) in contrast with a case where the main electrode layer is not divided (Comparative Example 1) are illustrated.

Example 1

Preparation of Sample and Measurement of Permeability

First, a conductive sheet used in a main electrode layer was prepared. 90 parts by mass of first carbon nanotube having an average fiber diameter of 150 nm and an average fiber length of 15 μm, and 10 parts by mass of second carbon nanotube having an average fiber diameter of 15 nm and an average fiber length of 3 μm on the basis of a total of 100 parts by mass of the first carbon nanotube and the second carbon nanotube were mixed in pure water. In addition, 1 part by mass of polyisothianaphthene sulfonic acid, which is a water-soluble conductive polymer, on the basis of the total of 100 parts by mass of the first carbon nanotube and the second carbon nanotube was added, thereby preparing a mixed solution. The mixed solution that was obtained was processed with a wet-type jet mill, thereby obtaining a dispersed solution of the carbon nanotube. 50 parts by mass of carbon fiber having an average fiber diameter of 7 μm and an average fiber length of 0.13 mm on the basis of the total of 100 parts by mass of the first and second carbon nanotubes and the carbon fiber was additionally added to the dispersed solution, and the dispersed solution was stirred by a magnetic stirrer to disperse the carbon fiber. The resultant dispersed solution was filtrated on filter paper, and was dehydrated in combination with the filter paper. Then, compression by a press machine and drying were performed to prepare a conductive sheet including the carbon nanotubes. An average thickness of the conductive sheet before being embedded was 0.4 mm.

The permeability of the prepared conductive sheet is proportional to a differential pressure $\Delta P$ and a length L, and thus the permeability was evaluated in a length L different from a length of a battery in Example 1. 30 sheets of the prepared conductive sheet were stacked in a total thickness of 1 cm, and a Ni mesh sheet of 60 meshes, which is constituted by a Ni wire of $\phi$ 0.10 mm, was disposed on both surfaces of the stacked body and was compressed. The stacked body was placed in a permeability-measuring cell having a cross-sectional area of 1.35 cm$^2$ (width: 50 mm, height: 2.7 mm) and a length of 1 cm for measurement. Water (20° C., viscosity=1.002 mPa·sec) was allowed to permeate through the permeability-measuring cell at a permeation flux of 0.5 cm/sec to measure a differential pressure (outlet pressure-inlet pressure) due to the stacked conductive sheets and calculated, and the permeability was calculated. The permeability of the conductive sheet used in Example 1 was $2.7 \times 10^{-13}$ m$^2$.

Next, as illustrated in FIG. 2 and FIGS. 3A and 3B, a groove was formed in a current collector plate constituted by a carbon plastic molded body to prepare a flow passage network having an inner wall in the current collector plate. The shape and arrangement of the flow passage network that was formed were set to the configuration in FIG. 2 and FIGS. 3A and 3B. The size of the entirety of flow passage networks including a peripheral edge wall was set to 50 mm×50 mm, and two flow passage networks having the size of 24.5 mm×50 mm were arranged in parallel with a gap having a width of 1 mm. At this time, the two flow passage networks were set to have the same shape. A width of an outer frame (peripheral edge wall) was set to 1.5 mm, a width of an inner wall was set to 1 mm, a width of the first flow passage C1 was set to 1 mm, and a width of the second flow passage C2 was set to 3 mm. The thickness of the flow passage networks (height of the peripheral edge wall) was set to 1 mm, the height of the inner wall was set to 1 mm, and the peripheral edge wall and the top surface of the inner wall were set to be flush with each other.

The depth of the first flow passage and the second flow passage was 1 mm. An opening was set to a position illustrated in FIG. 2, and a hole of 0.8 mm$\phi$ was formed in the peripheral edge wall. The flow passage networks were set to communicate with the opening, and a discharge passage was provided between both lateral surfaces of the peripheral edge wall and the two flow passage networks in a discharge direction illustrated in FIG. 2 (refer to the discharge passage 23 in FIG. 2). The discharge passage between the two flow passage networks was formed by using a space having the width of 1 mm.

The permeability of the flow passage networks formed in the current collector plate was measured by providing the same internal structure as that of the flow passage networks in a permeability-measuring cell. Water (20° C.) was allowed to permeate in an in-plane direction of the flow passage networks at a permeation flux of 2.0 cm/sec, and a differential pressure (outlet pressure-inlet pressure) by the same internal structure as that of the flow passage networks, and the permeability was calculated. The permeability in the first flow passage direction was $4.7 \times 10^{-10}$ m$^2$. In the second flow passage direction, the differential pressure at the permeation flux of 2.0 cm/sec was less than 1 kPa, and was less than the differential pressure in the first flow passage direction, and the permeability was greater than $1 \times 10^{-9}$ m$^2$. A ratio of the permeability between the flow passage networks and the conductive sheet was calculated by using a value in a direction of the first flow passage in which the ratio decreases.

In addition, as the liquid outflow layer, first carbon fiber (CF) paper (GDL10AA manufactured by SGL CARBON JAPAN Co., Ltd.) having a porous property was used. An average thickness of the first CF paper (CFP1) before being embedded was 0.2 mm.

The permeability of the first CF paper was measured by stacking 11 sheets of the first CF paper of 50 mm×50 mm, and providing the resultant stacked body in a permeability-measuring cell having a cross-sectional area of 1.35 cm$^2$ (width: 50 mm, and height: 2.7 mm) and a length of 5 cm in a state of being compressed in a stacking direction. Water (20° C.) was allowed to permeate through the permeability-measuring cell at a permeation flux of 0.5 cm/sec to measure a differential pressure (outlet pressure-inlet pressure) due to the stacked first CF paper, and the permeability was calculated. The permeability of the liquid outflow layer used in Example 1 was $4.1 \times 10^{-11}$ m$^2$.

Assembling of Battery

A battery was assembled by using the conductive sheet, the current collector plate in which the flow passage networks having an inner wall were prepared, and the first CF paper as the liquid outflow layer. Two conductive sheets of 24.5 mm×50 mm were arranged on the two flow passage networks (including the peripheral edge wall) formed in the current collector plate in parallel to each other with a gap having a width of 1 mm.

Two sheets of first CF paper were additionally stacked on each of the conductive sheets. The size of the first CF paper was set to 24.5 mm×50 mm, equal to the size of the flow passage networks (including the peripheral edge wall), and the two sheets of the first CF paper were arranged in parallel with a gap having a width of 1 mm in the same manner as in the conductive sheet.

As described above, the current collector plate including the flow passage networks, the conductive sheet, and the first CF paper were stacked in this order, thereby preparing an electrode of the redox flow battery.

In addition, as the ion-exchange membrane, Nafion N212 (registered trademark, manufactured by DuPont) was used, and two electrodes having the above-described configuration were respectively set as a positive electrode and a negative electrode. The redox flow battery was assembled by using the ion-exchange membrane, the electrodes, a frame (not illustrated), a gasket, a current collector plate, and a push plate. The thicknesses of the conductive sheet and the first CF paper after assembling were respectively 0.31 mm and 0.12 mm.

Examples 2 to 4, and Comparative Example 1

A difference between Examples 2 to 4, Comparative Example 1, and Comparative Example 2, and Example 1 is as follows.

In Example 2, three flow passage networks having the size of 16.0 mm×50 mm were arranged in parallel with a gap having a width of 1 mm. Three conductive sheets of 16.0 mm×50 mm were arranged in parallel with a gap having a width of 1 mm on the three flow passage networks (including the peripheral edge wall) formed in the current collector plate.

In Example 3, four flow passage networks having the size of 11.8 mm×50 mm were arranged in parallel with a gap having a width of 1 mm. Four conductive sheets of 11.8 mm×50 mm were arranged in parallel with a gap having a width of 1 mm on the four flow passage networks (including the peripheral edge wall) formed in the current collector plate.

In Example 4, five flow passage networks having the size of 9.2 mm×50 mm were arranged in parallel with a gap having a width of 1 mm. Five conductive sheets of 9.2 mm×50 mm were arranged in parallel with a gap having a width of 1 mm on the five flow passage networks (including the peripheral edge wall) formed in the current collector plate.

Comparative Example 1 is different from Examples in that one flow passage network having the size of 50 mm×50 mm was provided, and one conductive sheet of 47.0 mm×50 mm was disposed on the flow passage network (including the peripheral edge wall).

Cell resistivity of Examples 1 to 5, and Comparative Example 1 is illustrated in Table 1.

Furthermore, in Table 1 and the following description, a "width of a main electrode piece" represents a width of a portion (effective electrode area), which is not placed on the peripheral edge wall, of each main electrode piece. In addition, an "effective area ratio" represents a value obtained by dividing the sum of effective electrode areas of main electrode pieces in a case of being divided by an effective electrode area in a case of not being divided. The contents are also true of Table 2 to Table 6 described later.

An effective electrode area (the sum of effective electrode areas of main electrode pieces) in which a battery reaction occurs in Examples 1 to 4 is smaller than an effective electrode area in Comparative Example 1, but the cell resistivity is lower than the cell resistivity in Comparative Example 1. The reason for this result can be considered to be because the cell resistivity can be lowered due to a "division effect".

In Examples 1 to 4, the width of the main electrode pieces was in a range of 6.2 mm to 21.5 mm, and 0.7 Ω·cm$^2$ or less of cell resistivity was realized.

The cell resistivity was particularly lower in Examples 1 to 3, that is, in a case where the width of the main electrode piece was 8.8 mm to 24.5 mm.

TABLE 1

|  | Comparative Example 1 | Example 1 | Example 2 | Example 3 | Example 4 |
|---|---|---|---|---|---|
| Number of main electrode pieces | 1 | 2 | 3 | 4 | 5 |
| Width of main electrode piece [mm] | 47.0 | 21.5 | 13.0 | 8.8 | 6.2 |
| Thickness of liquid outflow layer [mm] | 0.2 | 0.2 | 0.2 | 0.2 | 0.2 |
| Cell resistivity [Ω·cm$^2$] | 0.74 | 0.62 | 0.62 | 0.66 | 0.70 |
| Effective area ratio | 100% | 91% | 83% | 75% | 66% |

Next, results in a case where the main electrode layer of 100 mm (width)×50 mm (length) is divided (includes a plurality of main electrode pieces) (Examples 6 to 41) in contrast with a case where the main electrode layer is not divided (Comparative Examples 2 to 7) are illustrated. Configurations other than the size are the same as in Example 1.

Examples 6 to 11, and Comparative Example 2

A difference between Examples 6 to 11 and Comparative Example 2, and Example 1 is as follows.

In Example 6, two flow passage networks having the size of 49.5 mm×50 mm were arranged in parallel with a gap having a width of 1 mm. Two conductive sheets of 49.5 mm×50 mm were arranged in parallel with a gap having a width of 1 mm on the two flow passage networks (including the peripheral edge wall) formed in the current collector plate.

In Example 7, three flow passage networks having the size of 32.7 mm×50 mm were arranged in parallel with a gap having a width of 1 mm. Three conductive sheets of 32.7 mm×50 mm were arranged in parallel with a gap having a width of 1 mm on the three flow passage networks (including the peripheral edge wall) formed in the current collector plate.

In Example 8, four flow passage networks having the size of 24.3 mm×50 mm were arranged in parallel with a gap having a width of 1 mm. Four conductive sheets of 24.3 mm×50 mm were arranged in parallel with a gap having a width of 1 mm on the four flow passage networks (including the peripheral edge wall) formed in the current collector plate.

In Example 9, five flow passage networks having the size of 19.2 mm×50 mm were arranged in parallel with a gap having a width of 1 mm. Five conductive sheets of 19.2 mm×50 mm were arranged in parallel with a gap having a width of 1 mm on the five flow passage networks (including the peripheral edge wall) formed in the current collector plate.

In Example 10, six flow passage networks having the size of 15.8 mm×50 mm were arranged in parallel with a gap having a width of 1 mm. Six conductive sheets of 15.8 mm×50 mm were arranged in parallel with a gap having a width of 1 mm on the six flow passage networks (including the peripheral edge wall) formed in the current collector plate.

In Example 11, seven flow passage networks having the size of 9.1 mm×50 mm were arranged in parallel with a gap having a width of 1 mm. Seven conductive sheets of 9.1 mm×50 mm were arranged in parallel with a gap having a width of 1 mm on the seven flow passage networks (including the peripheral edge wall) formed in the current collector plate.

Comparative Example 2 is different from Examples in that one flow passage network having the size of 100 mm×50 mm was provided, and one conductive sheet of 100 mm×50 mm was disposed on the flow passage network (including the peripheral edge wall).

Cell resistivity of Examples 6 to 11, and Comparative Example 2 is illustrated in Table 2.

An effective electrode area (the sum of effective electrode areas of main electrode pieces) in which a battery reaction occurs in Examples 6 to 11 is smaller than an effective electrode area in Comparative Example 2, but the cell resistivity in Examples 6 to 11 is lower than the cell resistivity in Comparative Example 2. The reason for this result can be considered to be because the cell resistivity can be lowered due to a "division effect" as in Examples 1 to 4.

In Examples 7 to 11, the width of the main electrode pieces was in a range of 6.1 mm to 29.7 mm, and 0.7 Ω·cm² or less of cell resistivity was realized.

The cell resistivity was particularly lower in Examples 8 and 9, that is, in a case where the width of the main electrode piece was 21.3 mm and 16.2 mm.

In the above-described case (Examples 1 to 4) in which the main electrode layer of 50 mm (width)×50 mm (length) was divided, in a case of being divided into five pieces (Example 4), the cell resistivity was 0.7 Ω·cm². In contrast, in a case of Examples 6 to 11 in which the main electrode layer of 100 mm (width)×50 mm (length) was divided, even in a case where the main electrode layer was divided into six pieces (Example 10), the cell resistivity was 0.65 Ω·cm². In a case where the main electrode layer was divided into 10 pieces (Example 11), the cell resistivity was 0.7 Ω·cm². In Example 11, the width of the main electrode piece was 6.1 mm, and was approximately the same as in Example 4 in which the width of the main electrode piece was 6.2 mm. This represents that the nature of the operational effect of the decrease in the cell resistivity is not "division itself", and one of main factors is a flowing distance of the electrolytic solution.

TABLE 2

|  | Comparative Example 2 | Example 6 | Example 7 | Example 8 | Example 9 | Example 10 | Example 11 |
| --- | --- | --- | --- | --- | --- | --- | --- |
| Number of main electrode pieces | 1 | 2 | 3 | 4 | 5 | 6 | 10 |
| Width of main electrode piece [mm] | 97.0 | 46.5 | 29.7 | 21.3 | 16.2 | 12.8 | 6.1 |
| Thickness of liquid outflow layer [mm] | 0.2 | 0.2 | 0.2 | 0.2 | 0.2 | 0.2 | 0.2 |
| Cell resistivity [Ω · cm²] | 0.90 | 0.74 | 0.64 | 0.62 | 0.61 | 0.65 | 0.70 |
| Effective area ratio | 100% | 96% | 92% | 88% | 84% | 79% | 63% |

Examples 12 to 17, and Comparative Example 3

A difference between Examples 12 to 17 and Comparative Example 3, and Example 6 is in that the average thickness of the first CF paper (CFP1), which is the liquid outflow layer, before being embedded was 0.3 mm, and the thickness after being embedded was 0.18 mm. Other configurations of Examples 12 to 17 and Comparative Example 3 are respectively the same as the configurations of Examples 6 to 11 and Comparative Example 2.

Cell resistivity of Examples 12 to 17 and Comparative Example 3 is illustrated in Table 3.

An effective electrode area (the sum of effective electrode areas of main electrode pieces) in which a battery reaction occurs in Examples 12 to 17 is smaller than the effective electrode area in Comparative Example 3, but the cell resistivity in Examples 12 to 17 is lower than the cell resistivity in Comparative Example 3. The reason for this result can be considered to be because the cell resistivity can be lowered due to a "division effect" as in Examples described above.

The cell resistivity in Examples 12 to 17 is greater than the cell resistivity in Examples 6 to 11 having the same configuration as in Examples 12 to 17 except for the thickness of the liquid outflow layer. This result represents that the thickness of the liquid outflow layer has a great effect on the cell resistivity.

However, in a case of Example 14, that is, in a case where the width of the main electrode piece is 21.3 mm, 0.7 Ω·cm² or less of cell resistivity was realized.

TABLE 3

|  | Comparative Example 3 | Example 12 | Example 13 | Example 14 | Example 15 | Example 16 | Example 17 |
| --- | --- | --- | --- | --- | --- | --- | --- |
| Number of main electrode pieces | 1 | 2 | 3 | 4 | 5 | 6 | 10 |

TABLE 3-continued

|  | Comparative Example 3 | Example 12 | Example 13 | Example 14 | Example 15 | Example 16 | Example 17 |
|---|---|---|---|---|---|---|---|
| Width of main electrode piece [mm] | 97.0 | 46.5 | 29.7 | 21.3 | 16.2 | 12.8 | 6.1 |
| Thickness of liquid outflow layer [mm] | 0.3 | 0.3 | 0.3 | 0.3 | 0.3 | 0.3 | 0.3 |
| Cell resistivity [$\Omega \cdot cm^2$] | 0.95 | 0.77 | 0.73 | 0.70 | 0.72 | 0.77 | 0.84 |
| Effective area ratio | 100% | 96% | 92% | 88% | 84% | 79% | 63% |

Examples 18 to 22 and Comparative Example 4

A difference between Examples 18 to 22 and Comparative Example 4, and Example 6 is in that the average thickness of the first CF paper (CFP1), which is the liquid outflow layer, before being embedded was 0.5 mm, and the thickness after being embedded was 0.30 mm. Other configurations of Examples 18 to 22 are respectively the same as the configurations of Examples 6 to 10, and other configuration of Comparative Example 4 are the same as the configurations of Comparative Example 2.

Cell resistivity of Examples 18 to 22 and Comparative Example 4 is illustrated in Table 4.

An effective electrode area (the sum of effective electrode areas of main electrode pieces) in which a battery reaction occurs in Examples 18 to 22 is smaller than the effective electrode area in Comparative Example 4, but the cell resistivity in Examples 18 to 22 is lower than the cell resistivity in Comparative Example 4. The reason for this result can be considered to be because the cell resistivity can be lowered due to a "division effect" as in Examples described above.

The cell resistivity in Examples 18 to 22 is greater than the cell resistivity in Examples 6 to 11 and Examples 12 to 17 which have the same configuration as in Examples 18 to 22 except for the thickness of the liquid outflow layer. This result represents that the thickness of the liquid outflow layer has a great effect on the cell resistivity.

In all of Examples 18 to 22, the cell resistivity was 0.7 $\Omega \cdot cm^2$ or greater. In the configuration illustrated in Examples, it is necessary for the liquid outflow layer to be 0.3 mm or less. However, this is applied to the configuration illustrated in Examples. It is needless to say that the necessity does not represent difficulty in realization of 0.7 $\Omega \cdot cm^2$ or less of cell resistivity if the liquid outflow layer is not 0.3 mm or less.

The cell resistivity is particularly lower in Examples 18 to 20, that is, in a case where the width of the main electrode piece is 21.3 mm to 46.5 mm.

On the basis of the results in Examples 6 to 22, it is preferable that the width of the main electrode piece be in a range of 10 mm to 45 mm, more preferably in a range of 15 mm to 40 mm, and still more preferably in a range of 20 mm to 35 mm.

Examples 23 to 27 and Comparative Example 5

First, a difference between Examples 23 to 27 and Comparative Example 5, and Example 6 is in that the average thickness of the first CF paper (CFP1), which is the liquid outflow layer, before being embedded was 0.7 mm, and the thickness after being embedded was 0.42 mm. Other configurations of Examples 23 to 27 are respectively the same as the configurations of Examples 6 to 10, and configuration of Comparative Example 5 are the same as the configurations of Comparative Example 3.

Cell resistivity of Examples 23 to 27 and Comparative Example 5 is illustrated in Table 5.

An effective electrode area (the sum of effective electrode areas of main electrode pieces) in which a battery reaction occurs in Examples 23 to 27 is smaller than the effective electrode area in Comparative Example 5, but the cell resistivity in Examples 23 to 27 is lower than the cell resistivity in Comparative Example 5. The reason for this result can be considered to be because the cell resistivity can be lowered due to a "division effect" as in Examples described above.

The cell resistivity in Examples 23 to 27 is greater than the cell resistivity in Examples 6 to 11, Examples 12 to 17, and Examples 18 to 22 which have the same configuration as in Examples 23 to 27 except for the thickness of the liquid outflow layer. This result represents that the thickness of the liquid outflow layer has a great effect on the cell resistivity.

The cell resistivity is particularly lower in Examples 23 to 25, that is, in a case where the width of the main electrode piece is 21.3 mm to 46.5 mm.

TABLE 4

|  | Comparative Example 4 | Example 18 | Example 19 | Example 20 | Example 21 | Example 22 |
|---|---|---|---|---|---|---|
| Number of main electrode pieces | 1 | 2 | 3 | 4 | 5 | 6 |
| Width of main electrode piece [mm] | 97.0 | 46.5 | 29.7 | 21.3 | 16.2 | 12.8 |
| Thickness of liquid outflow layer [mm] | 0.5 | 0.5 | 0.5 | 0.5 | 0.5 | 0.5 |
| Cell resistivity [$\Omega \cdot cm^2$] | 1.00 | 0.86 | 0.86 | 0.87 | 0.90 | 0.96 |
| Effective area ratio | 100% | 96% | 92% | 88% | 84% | 79% |

TABLE 5

|  | Comparative Example 5 | Example 23 | Example 24 | Example 25 | Example 26 | Example 27 |
|---|---|---|---|---|---|---|
| Number of main electrode pieces | 1 | 2 | 3 | 4 | 5 | 6 |
| Width of main electrode piece [mm] | 97.0 | 46.5 | 29.7 | 21.3 | 16.2 | 12.8 |
| Thickness of liquid outflow layer [mm] | 0.7 | 0.7 | 0.7 | 0.7 | 0.7 | 0.7 |
| Cell resistivity [Ω · cm$^2$] | 1.20 | 1.06 | 1.06 | 1.07 | 1.10 | 1.16 |
| Effective area ratio | 100% | 96% | 92% | 88% | 84% | 79% |

Examples 28 to 32 and Comparative Example 6

A difference between Examples 28 to 32 and Comparative Example 6, and Example 6 is in that the average thickness of the first CF paper (CFP1), which is the liquid outflow layer, before being embedded was 1.0 mm, and the thickness after being embedded was 0.6 mm. Other configurations of Examples 28 to 32 are respectively the same as the configurations of Examples 6 to 10, and configuration of Comparative Example 6 are the same as the configurations of Comparative Example 3.

Cell resistivity of Examples 28 to 32 and Comparative Example 6 is illustrated in Table 6.

An effective electrode area (the sum of effective electrode areas of main electrode pieces) in which a battery reaction occurs in Examples 28 to 32 is smaller than the effective electrode area in Comparative Example 6, but the cell resistivity in Examples 28 to 32 is lower than the cell resistivity in Comparative Example 6. The reason for this result can be considered to be because the cell resistivity can be lowered due to a "division effect" as in Examples described above.

The cell resistivity in Examples 28 to 32 is greater than the cell resistivity in Examples 6 to 11, Examples 12 to 17, Examples 18 to 22, and Examples 23 to 27 which have the same configuration as in Examples 28 to 32 except for the thickness of the liquid outflow layer. This result represents that the thickness of the liquid outflow layer has a great effect on the cell resistivity.

The cell resistivity is particularly low in Examples 28 and 29, that is, in a case where the width of the main electrode piece is 29.7 mm to 46.5 mm.

Example 33

The thickness of the flow passage network of the current collector plate (the height of the peripheral edge wall) was set to 1 mm, and the height of the inner wall was set to 0.6 mm. That is, the peripheral edge wall and the top surface of the inner wall were not flush with each other. As the liquid inflow layer, carbon paper (manufactured by TORAY INDUSTRIES, INC., product name: Torayca TGP H-120, thickness: 0.4 mm) was used, and the carbon paper of 21.5 mm×47 mm was inserted into an accommodation portion of two flow passage networks formed in the current collector plate. The carbon paper (liquid inflow layer) was inserted into the accommodation portion with no gap without protruding from the accommodation portion. Furthermore, the permeability of the carbon paper was $2.1 \times 10^{-11}$ m$^2$ (the permeability was obtained by the same method as the method of measuring the permeability of the liquid outflow layer in Example 1).

A sample was prepared in the same manner as in Example 1 except for the above-described configuration, and the conductivity sheet and the first CF paper were arranged, thereby assembling a cell. Then, the same experiment as described above was performed.

TABLE 7

|  | Example 33 |
|---|---|
| Number of main electrode pieces | 2 |
| Width of main electrode piece [mm] | 21.5 |
| Thickness of liquid outflow layer [mm] | 0.2 |
| Cell resistivity [Ω · cm$^2$] | 0.63 |
| Effective area ratio | 91% |

Experiment Relating to Prevention of Flowing-Out of Carbon Nanotube

In Example 33, an experiment relating to prevention of flowing-out of the carbon nanotube was also performed. Specifically, 100 ml of a positive-electrode electrolytic solution, and 100 ml of a negative-electrode electrolytic solution

TABLE 6

|  | Comparative Example 6 | Example 28 | Example 29 | Example 30 | Example 31 | Example 32 |
|---|---|---|---|---|---|---|
| Number of main electrode pieces | 1 | 2 | 3 | 4 | 5 | 6 |
| Width of main electrode piece [mm] | 97.0 | 46.5 | 29.7 | 21.3 | 16.2 | 12.8 |
| Thickness of liquid outflow layer [mm] | 1 | 1 | 1 | 1 | 1 | 1 |
| Cell resistivity [Ω · cm$^2$] | 1.48 | 1.42 | 1.42 | 1.44 | 1.45 | 1.46 |
| Effective area ratio | 100% | 96% | 92% | 88% | 84% | 79% | were prepared, and charging and discharging were repeated 1000 times under the same conditions as in the calculation of the cell resistivity by using the above-described cell. Then, the electrolytic solutions were drained, and an effect of prevention of flowing-out of the carbon nanotube was investigated in accordance with a measurement method in an experiment relating to prevention of flowing-out of the carbon nanotube. From results of SEM observation, the carbon nanotube was not observed on a membrane filter that was used in filtration of the electrolytic solutions after being used. According to this, it was confirmed that flowing-out of the carbon nanotube was prevented.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A redox flow battery, comprising:
   an ion-exchange membrane;
   a current collector plate; and
   an electrode that is disposed between the ion-exchange membrane and the current collector plate,
   wherein the current collector plate includes a plurality of flow passage networks formed in a surface on the electrode side and through which an electrolytic solution circulates, and
   wherein the plurality of flow passage networks includes liquid inflow passages supplying electrolytic solution to the electrode and liquid outflow passages discharging electrolytic solution to outside of the electrode,
   wherein the electrode includes a main electrode layer having a region in which an electrolytic solution flow from a surface on the current collector plate side to a surface on the ion-exchange membrane side, and
   the region includes a plurality of main electrode pieces which are arranged in parallel in a plane direction,
   wherein the electrode further includes a liquid outflow layer that is disposed on an ion-exchange membrane side of the main electrode pieces and a liquid inflow layer that is disposed between the main electrode layer and the current collector, and
   wherein the liquid inflow layer is in fluid communication with the liquid inflow passages and the outflow layer is in fluid communication with the liquid outflow passages.

2. The redox flow battery according to claim 1, wherein cell resistivity is 0.7 $\Omega \cdot cm^2$ or less.

3. The redox flow battery according to claim 1, wherein an electrolytic solution discharge passage is provided between the main electrode pieces adjacent to each other.

4. The redox flow battery according to claim 1, wherein
   the main electrode pieces are respectively disposed on the plurality of flow passage networks.

5. The redox flow battery according to claim 1, wherein the main electrode pieces are constituted by a conductive sheet including a carbon nanotube having an average fiber diameter of 1 μm or less.

6. The redox flow battery according to claim 1, wherein when a sheet surface of the main electrode pieces is set as a reference surface, a Darcy's rule permeability in an in-plane direction in the liquid outflow layer is greater than a Darcy's rule permeability in a normal direction of the conductive sheet.

7. The redox flow battery according to claim 4, wherein each of the plurality of flow passage networks is surrounded by a peripheral edge wall, and includes a first flow passage and a second flow passage which are formed by an inner wall, the first flow passage extends from a liquid inflow port that is formed on one end side of the peripheral edge wall toward the other end side, and the second flow passage communicates with the first flow passage, and extends in a direction of intersecting the first flow passage.

8. The redox flow battery according to claim 1, wherein the thickness of the liquid outflow layer is 0.1 mm to 0.9 mm.

9. The redox flow battery according to claim 1, wherein each of the plurality of main electrode pieces has a rectangular shape, and a length of a short side is 5 mm to 70 mm.

10. The redox flow battery according to claim 1, wherein the thickness of the liquid outflow layer is 1/150 or more times the length of the short side of the main electrode pieces.

11. The redox flow battery according to claim 7, wherein an end of each of the plurality of main electrode pieces is placed on a top surface of the peripheral edge wall.

12. The redox flow battery according to claim 1, wherein an effective area ratio is 60% or greater, and the effective area ratio is (sum of effective electrode areas of the plurality of main electrode pieces)/{(sum of the areas of the plurality of main electrode pieces)+(sum of areas of portions between the plurality of main electrode pieces)}.

13. The redox flow battery according to claim 1, wherein the current collector plate includes a peripheral edge wall, the liquid inflow layer is disposed between parts of the peripheral edge wall, the main electrode layer is placed on a top surface of the peripheral edge wall, and the liquid outflow layer is disposed on the main electrode layer.

14. The redox flow battery according to claim 1, wherein the main electrode layer is constituted by a conductive sheet including a carbon nanotube, and the liquid outflow layer is constituted by a carbon felt including a carbon fiber, or carbon paper.

15. The redox flow battery according to claim 1, wherein the main electrode layer is constituted by a conductive sheet including a carbon nanotube, and both of the liquid outflow layer and the liquid inflow layer are constituted by a carbon felt including a carbon fiber, or carbon paper.

* * * * *